(12) United States Patent
Tamagawa et al.

(10) Patent No.: US 8,365,858 B2
(45) Date of Patent: Feb. 5, 2013

(54) HARNESS ARRANGEMENT STRUCTURE OF VEHICLE

(75) Inventors: Taro Tamagawa, Hiroshima (JP); Yoshio Nakamura, Hiroshima (JP); Yo Yamada, Hiroshima (JP); Seigo Suzuki, Hiroshima (JP)

(73) Assignee: Mazda Motor Corporation (JP)

( * ) Notice: Subject to any disclaimer, the term of this patent is extended or adjusted under 35 U.S.C. 154(b) by 0 days.

(21) Appl. No.: 13/331,916

(22) Filed: Dec. 20, 2011

(65) Prior Publication Data

US 2012/0160578 A1    Jun. 28, 2012

(30) Foreign Application Priority Data

Dec. 27, 2010  (JP) .................................. 2010-291194
Nov. 15, 2011  (JP) .................................. 2011-249542

(51) Int. Cl.
    *B60K 1/00*          (2006.01)
(52) U.S. Cl. ....................................... 180/291; 180/68.5
(58) Field of Classification Search ................. 180/68.5, 180/65.22, 65.225, 65.25, 291; 307/10.1
    See application file for complete search history.

(56) References Cited

U.S. PATENT DOCUMENTS

| 6,457,542 B1* | 10/2002 | Hosono et al. ............... 180/68.1 |
| 6,491,120 B1* | 12/2002 | Ogburn ...................... 180/65.25 |
| 6,827,168 B2* | 12/2004 | Miyazaki ..................... 180/68.5 |
| 7,342,325 B2* | 3/2008 | Rhodes ....................... 307/10.6 |
| 7,430,847 B2* | 10/2008 | Hoffman et al. ............... 56/10.8 |
| 7,523,979 B2* | 4/2009 | Jeong ........................ 296/187.09 |
| 7,561,445 B2* | 7/2009 | Yajima et al. ................ 361/826 |
| 7,631,711 B2* | 12/2009 | Kubo .......................... 180/68.1 |
| 7,982,332 B2* | 7/2011 | Nelson et al. ................ 307/10.1 |
| 2003/0236016 A1* | 12/2003 | Murakami et al. ........... 439/212 |
| 2004/0027001 A1* | 2/2004 | Reed, III .................... 307/10.1 |
| 2009/0294626 A1* | 12/2009 | Abe et al. .................... 248/675 |
| 2011/0156644 A1* | 6/2011 | Arai ........................... 320/109 |
| 2012/0119573 A1* | 5/2012 | Turudic ....................... 307/10.1 |

FOREIGN PATENT DOCUMENTS

JP    2006-089040 A    4/2006
JP    2006-281806 A   10/2006

* cited by examiner

*Primary Examiner* — John Walters
*Assistant Examiner* — James Triggs
(74) *Attorney, Agent, or Firm* — Studebaker & Brackett PC; Donald R. Studebaker

(57) ABSTRACT

A harness arrangement structure of a vehicle comprises a pair of front side frames extending in a vehicle longitudinal direction, an internal combustion engine provided between the front side frames, a pair of front tires provided on a vehicle outside of the front side frames, a battery device provided at a specified position which is located on the vehicle outside of the front side frame and in front of one of the front tires, an electric-power control device for battery device provided in back of the front tire, and a harness interconnecting the electric-power control device and the battery device and arranged along a wheel arch which is formed above the front tires. Accordingly, the battery device can be effectively cooled and the harness interconnecting the battery device and the electric-power control device can be arranged properly.

13 Claims, 20 Drawing Sheets

HARNESS ARRANGEMENT STRUCTURE OF VEHICLE

BACKGROUND OF THE INVENTION

The present invention relates to a harness arrangement structure of a vehicle which interconnects a battery device and an electric-power control device of a vehicle.

Conventionally, a vehicle equipped with a fuel cell, in which a battery device, such as lead-acid battery, is provided below a floor of a vehicle compartment and a controller portion (an electric-power control device) of the battery device is provided in a front compartment of the vehicle, is known as disclosed in Japanese Patent Laid-Open Publication No. 2006-89040, for example.

Further, Japanese Patent Laid-Open Publication No. 2006-281806 discloses an arrangement structure of an engine-assist device for a vehicle, in which plural batteries which are comprised of the lead-acid battery are provided separately on both sides in an engine room formed at a front portion of the vehicle.

Herein, there is a tendency that the above-described battery device comprised of the capacitor or the like generates heat during its use, so that its electric characteristics decrease improperly. Accordingly, it may be preferable that the battery device be cooled properly by traveling air of the vehicle or the like. In a case in which the battery device is provided below the floor of the vehicle compartment as disclosed in the above-described first patent document, however, the traveling air may not hit against the battery device easily, so that the efficient cooling of the battery device may not be achieved.

If the battery device is provided in the engine room at the vehicle front portion as disclosed in the above-described second patent document, meanwhile, there is a problem in that the battery device may receive a heat influence from the engine too much. Further, in a case in which the electric-power control device to control the battery device is provided in the vehicle compartment in addition to the battery device being provided in the engine room, there is another problem in that an appropriate arrangement of a harness interconnecting the battery device and the electric-power control device may be difficult.

SUMMARY OF THE INVENTION

The present invention has been devised in view of the above-described matters, and an object of the present invention is to provide a harness arrangement structure of a vehicle which can effectively cool the battery device and properly arrange the harness interconnecting the battery device and the electric-power control device.

According to the present invention, there is provided a harness arrangement structure of a vehicle, comprising a pair of front side frames extending in a vehicle longitudinal direction, an internal combustion engine provided between the front side frames, a pair of front tires provided on a vehicle outside of the front side frames, a battery device provided at a specified position which is located on the vehicle outside of one of the front side frames and in front of one of the front tires, an electric-power control device for the battery device provided in back of the one of the front tires, and a harness interconnecting the electric-power control device and the battery device and arranged along a wheel arch which is formed above the one of the front tires.

According to the present invention, since it is provided at the specified position which is located on the vehicle outside of front side frame, the battery device can be cooled efficiently by the traveling air of the vehicle, preventing it from receiving any improper heat influence from the engine effectively. Further, since the harness interconnecting the electric-power control device and the battery device is arranged along the wheel arch, despite an arrangement of the battery device and the electric-power control device which are respectively located in front of the front tire and in back of the front tire, it can be prevented that the harness interferes with the front tire and the length of the harness is too long, so that the battery device and the electric-power control device can be properly interconnected by the harness.

According to an embodiment of the present invention, the harness is arranged between a mudguard forming the wheel arch and a wheel apron member provided above the mudguard. Thereby, an arrangement state of the harness can be stable, and the mudguard can prevent the harness from receiving any improper influence from rain, small stones, or the like during the vehicle traveling.

According to another embodiment of the present invention, the harness is arranged along a front face of a side portion of a dash panel located at a front portion of a vehicle compartment, and a protector to protect the harness is provided along the front face of the side portion of the dash panel. Thereby, since an arrangement portion of the harness is protected by the protector, the harness arranged along the wheel arch can be prevented from twisting, so that the arrangement state of the harness can be more stable.

According to another embodiment of the present invention, the electric-power control device is provided above a floor panel forming a bottom face of a vehicle compartment, the harness is arranged to extend along a lower face of the floor panel to a position in the vicinity of the electric-power control device and then led up to the electric-power control device positioned above the floor panel. Thereby, the floor panel can effectively prevent the electric-power control device from receiving any improper influence from rain, small stones, or the like during the vehicle traveling, and the harness can be arranged properly, preventing a foot space of the passenger seated in a seat from being narrowed.

According to another embodiment of the present invention, a protector to protect the harness arranged along the lower face of the floor panel is provided above a lower end face of a frame member which is provided along the lower face of the floor panel. Thereby, the harness can be protected by the protector effectively, and it can be prevented that the protector interferers with a road surface during the vehicle traveling, thereby restraining any damage of the protector.

According to another embodiment of the present invention, the harness arrangement structure further comprises a cross member extending in a vehicle width direction and interconnecting the pair of front side frames, wherein an electric-power supply device is provided between the pair of front side frames, and a harness which interconnects the electric-power supply device and the battery device is arranged along the cross member. Thereby, even if the electric-power supply device and the battery device are arranged away from each other in the engine room, the harness interconnecting these devices can be supported at the cross member stably.

Other features, aspects, and advantages of the present invention will become apparent from the following description which refers to the accompanying drawings.

DETAILED DESCRIPTION OF THE INVENTION

Hereafter, a preferred embodiment of the present invention will be descried referring to the accompanying drawings.

Figure 1:
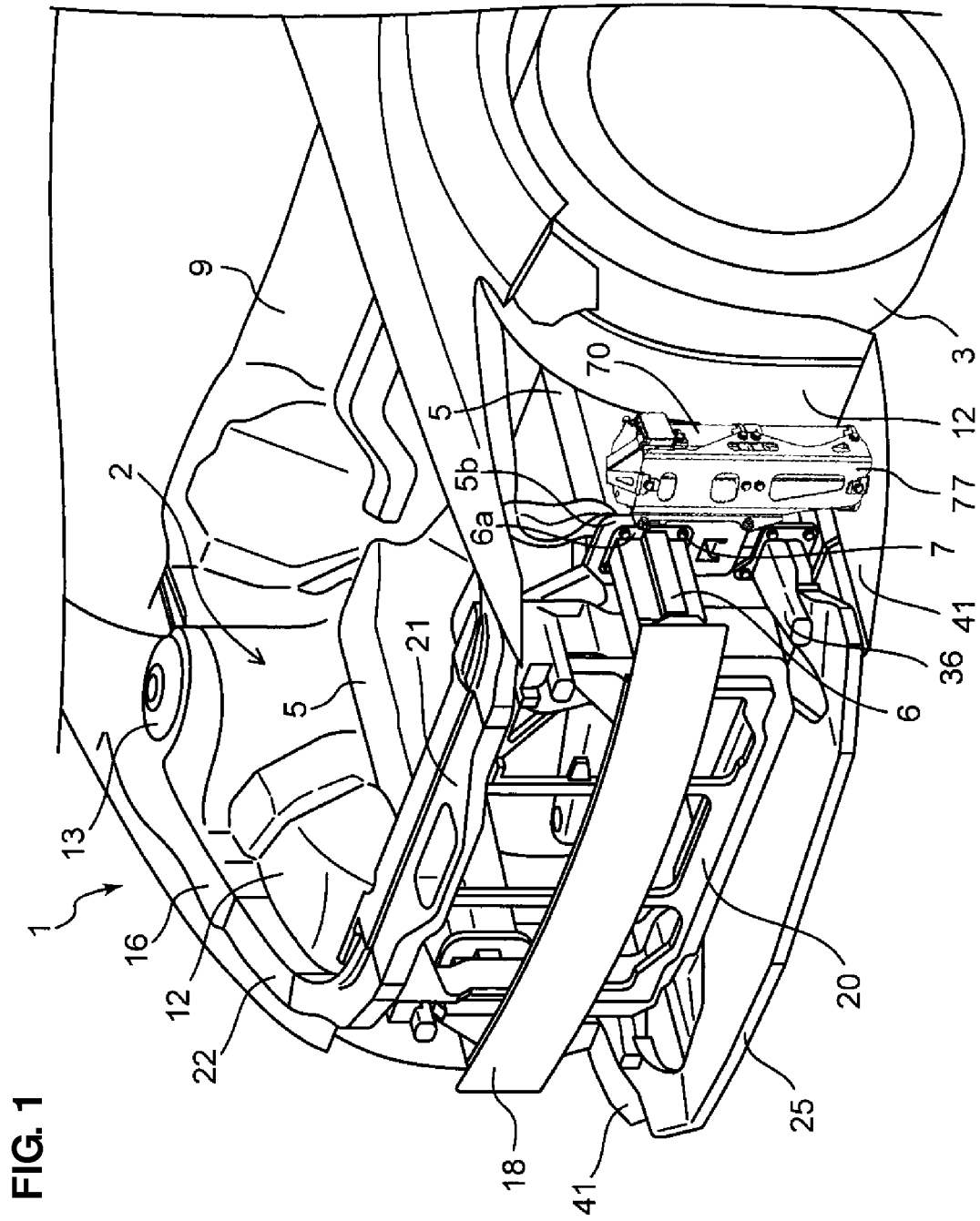
FIG. 1 is a perspective view showing a major part of a front portion of a vehicle to which a harness arrangement structure according to an embodiment of the present invention is applied, when viewed obliquely from a vehicle front side and a vehicle left side.
Figure 2:
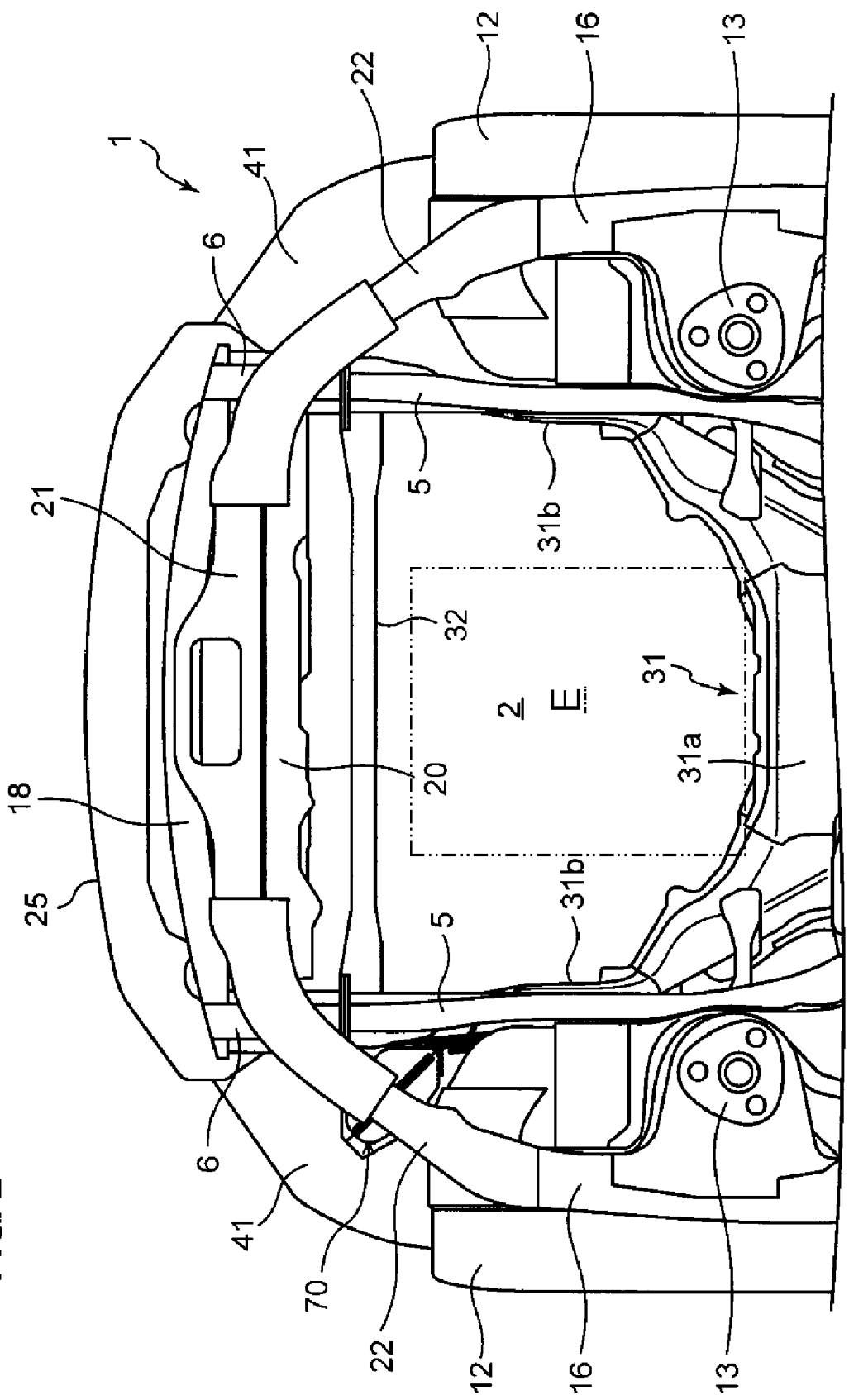
FIG. 2 is a plan view showing a structure of a major part of an engine room.
Figure 3:
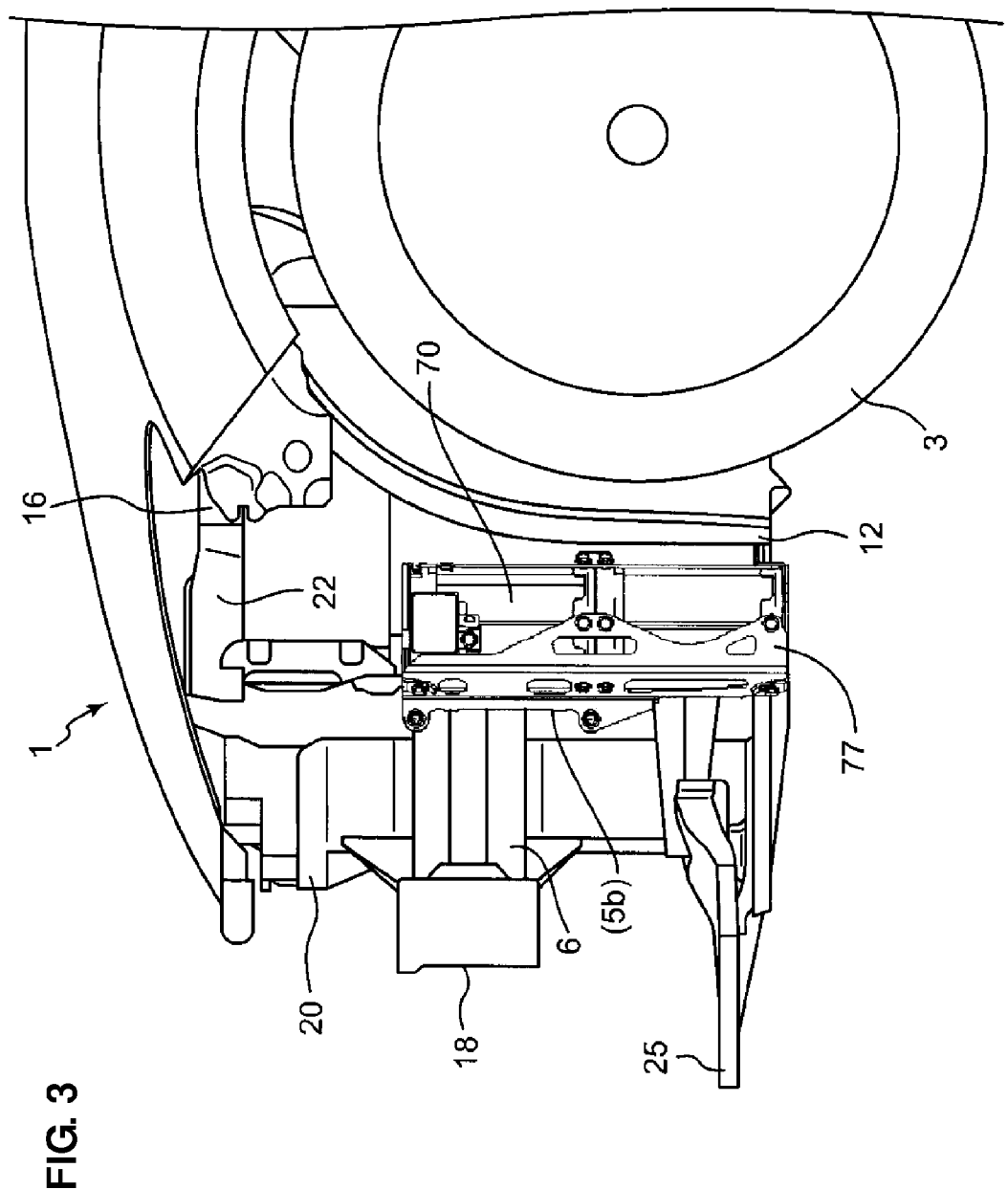
FIG. 3 is a side view showing the engine room, when viewed from the vehicle left side.

FIGS. 1 through 3 show a structure of a front portion of a vehicle 1 to which a harness arrangement structure according to an embodiment of the present invention is applied. In an engine room 2 located at the front portion of the vehicle 1 are provided an engine (an internal combustion engine) E and a transmission (not illustrated) which drive a pair of front tires 3. A pair of front side frames 5 is provided at both side end portions, in a vehicle width direction, of the engine room 2 to extend in a vehicle longitudinal direction.

A dash panel 9 which partitions the engine room 2 from a vehicle compartment 4 is provided at a specified longitudinal position which corresponds to a kick-up portion 5a formed at a rear portion of the front side frames 5 (see FIG. 1). A wheel house panel 12 and a suspension tower 13 are provided at each of outside faces of the front side frames 5.

An upper end portion of the wheel house panel 12 is connected to a wheel apron member 16, and an upper end portion of the suspension tower 13 is connected to the wheel apron member 16. A front bumper, not illustrated, is provided at a front end portion of the vehicle 1, and a bumper beam 18 which extends in the vehicle width direction is disposed inside the front bumper.

A crash can 6 is attached to a front end of each of the front side frames 5. Both a flange portion 6a which is provided at a rear end of the crash can 6 and a flange portion 5b which is provided at the front end of the front side frame 5 are fixed together by a fastening member 7 which is comprised of bolt and nut.

Between the right and left crash cans 6 behind the bumper beam 18 is provided a frame-shaped shroud 20 which supports a radiator, not illustrated. An upper member 21 which constitutes an upper portion of the shroud 20 extends outwardly and rearwardly, and both end portions of the upper member 21 are connected to front ends of the right and left wheel apron members 16 via connecting members 22, respectively.

A stiffener for pedestrian protection 25 is formed at a lower portion of the shroud 20 to project forwardly. This stiffener 25 operates to sweep away a leg portion of a pedestrian so as to move the pedestrian onto an engine hood when the pedestrian hits against a front face of the vehicle, thereby protecting the pedestrian properly.

Figure 4:
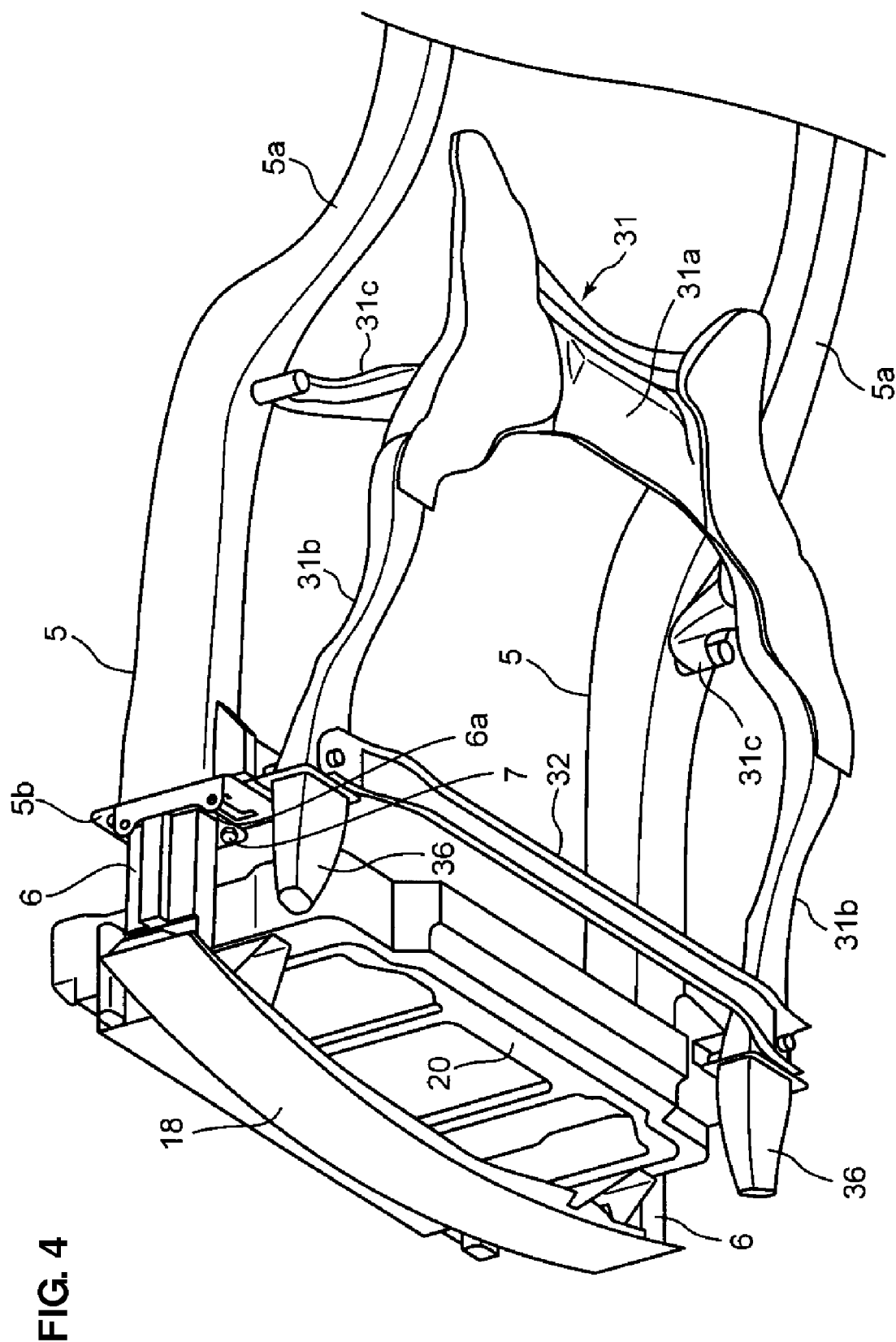
FIG. 4 is a perspective view showing the engine room, when viewed obliquely from the vehicle left side and a vehicle lower side.
Figure 5:
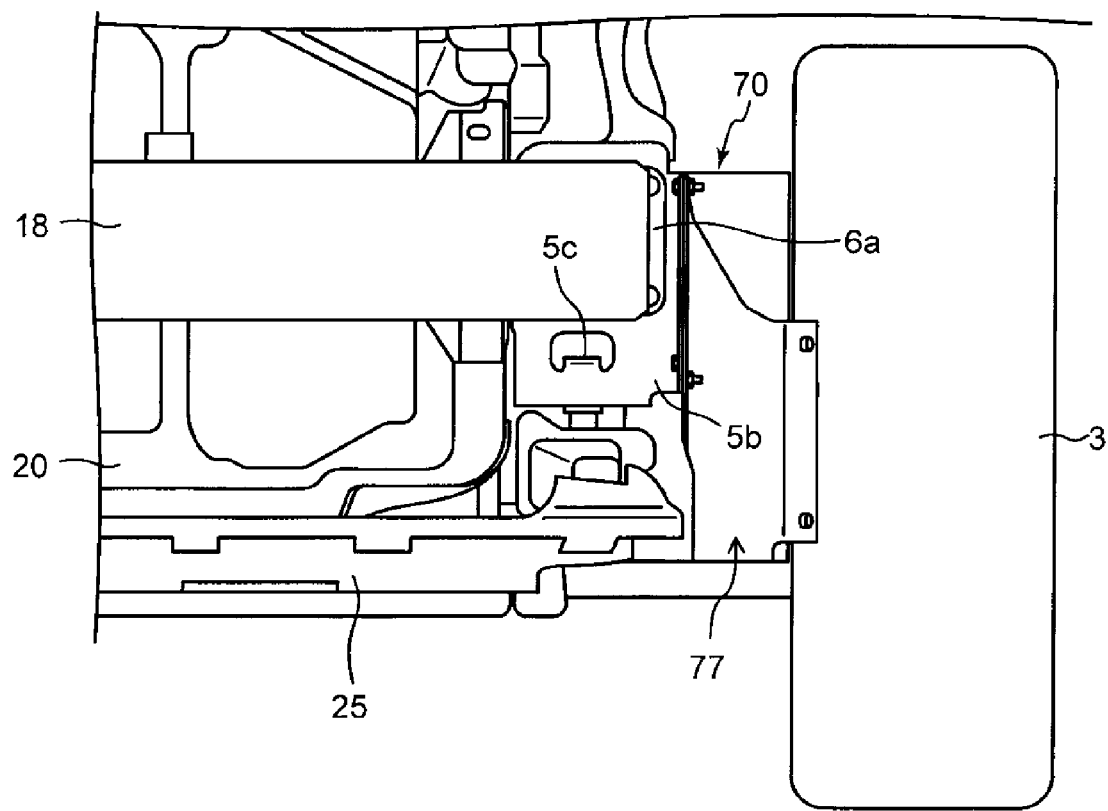
FIG. 5 is an elevational view of a left side of the engine room, when viewed from the vehicle front side.
Figure 6:
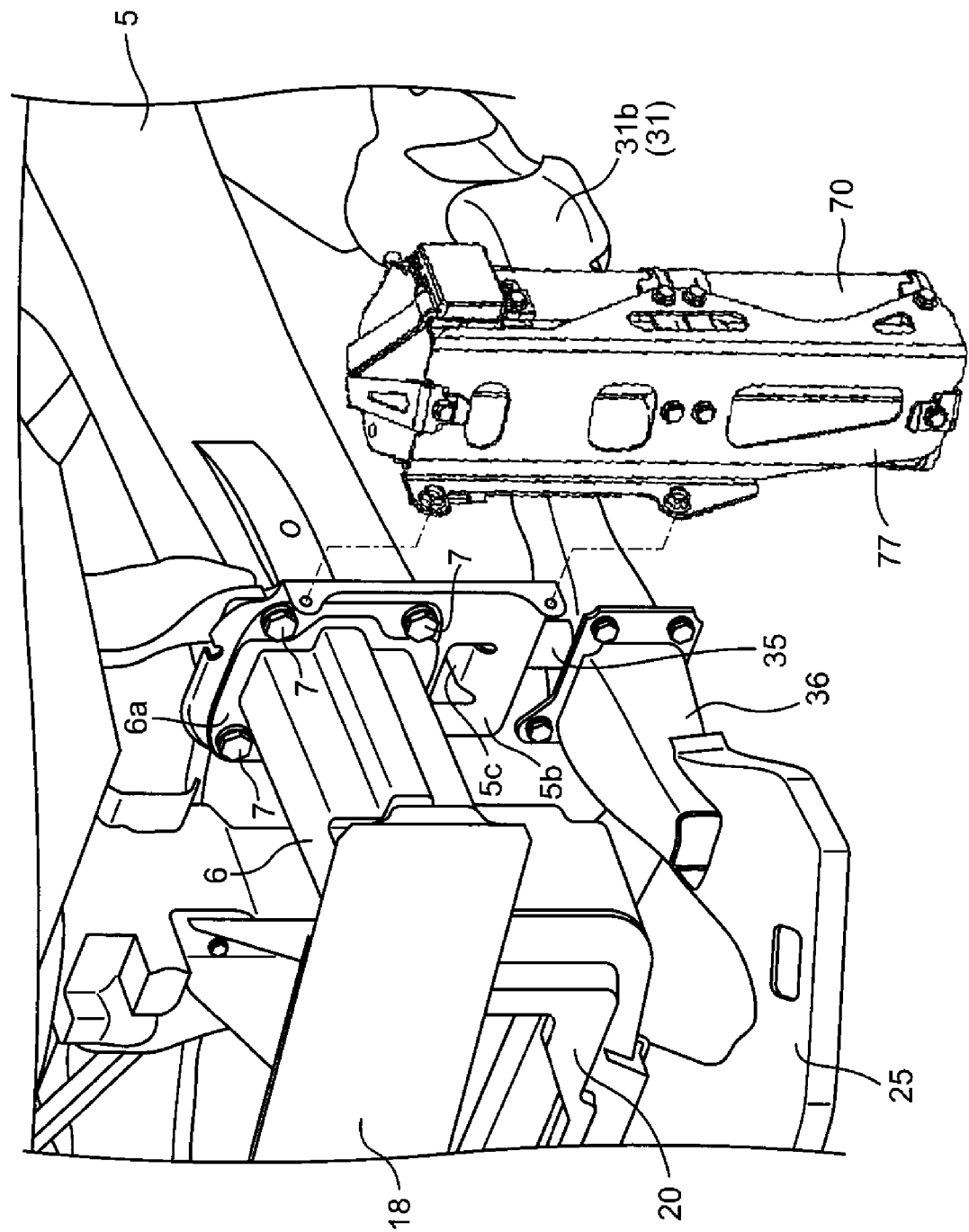
FIG. 6 is a perspective view of an attachment portion of a battery device, when viewed obliquely from the vehicle left side and the vehicle front side.

A suspension cross member 31 which supports right and left front tires 3 is provided at a specified longitudinal position corresponding to the suspension tower 13 to extend in the vehicle width direction (see FIG. 4). The suspension cross member 31 comprises a cross member body portion 31a and right and left forward-extension portions 31b which extend forwardly from both-side end portions of the cross member body portion 31a.

A pair of suspension arms (lower arms) for front tires, not illustrated, is supported at the both-side end portions of the cross member body portion 31a, and the front tires 3 are supported at the suspension cross member 31 via the pair of suspension arms. Upward extension portions 31c which extend upwardly are provided at both-side end portions on an upper face of the cross member body portion 31a, and upper end portions of the upward extension portions 31c are fixed to respective lower faces of the front side frames 5.

Front end portions of lower faces of the upward extension portions 31b of the suspension cross member 31 are connected to a connection cross member 32 which extends in the vehicle width direction in front of the suspension cross member 31. The connection cross member 32, the cross member body portion 31a and the forward extension portions 31b of the suspension cross member 31 constitute a perimeter frame (a vehicle-body member) which is of a substantially-rectangular frame shape in a plan view.

A cylindrical member 35 which extends upwardly is fixed to an upper face of each of front end portions of the forward extension portions 31b, and an upper end of the cylindrical member 35 is fixed to a lower face of a fixing portion 5c which is formed at a lower portion of the flange portion 5b of the front side frame 5 to bend substantially horizontally (see FIG.

6). Further, a connecting member 36 which is connected to right and left end portions of the stiffener 25 is fixed to a front end of each of the forward extension portions 31b.

A left-side undercover 41 is provided at a portion extending from the left end of the stiffener 25 to a front end portion of the left wheel house panel 12 (i.e., at a lower portion of a left-front corner portion of the vehicle 1), and a right-side undercover 41 is provided at a portion extending from the right end of the stiffener 25 to a front end portion of the right wheel house panel 12 (i.e., at a lower portion of a right-front corner portion of the vehicle 1). Thus, the undercover 41 covers a lower face of the vehicle body.

A support member 77 is provided on the vehicle outside (left side) of the left-side front side frame 5, that is, on the left side of the engine room 2 and in front of the front tire 3 and in back of the crash can 6 (above the left-side undercover 41). Inside this support member 77 is provided a battery device 70 which comprises plural battery elements comprised of the capacitor. The support member 77 is attached to the flange portion 5b of the left-side front side frame 5.

Figure 7:
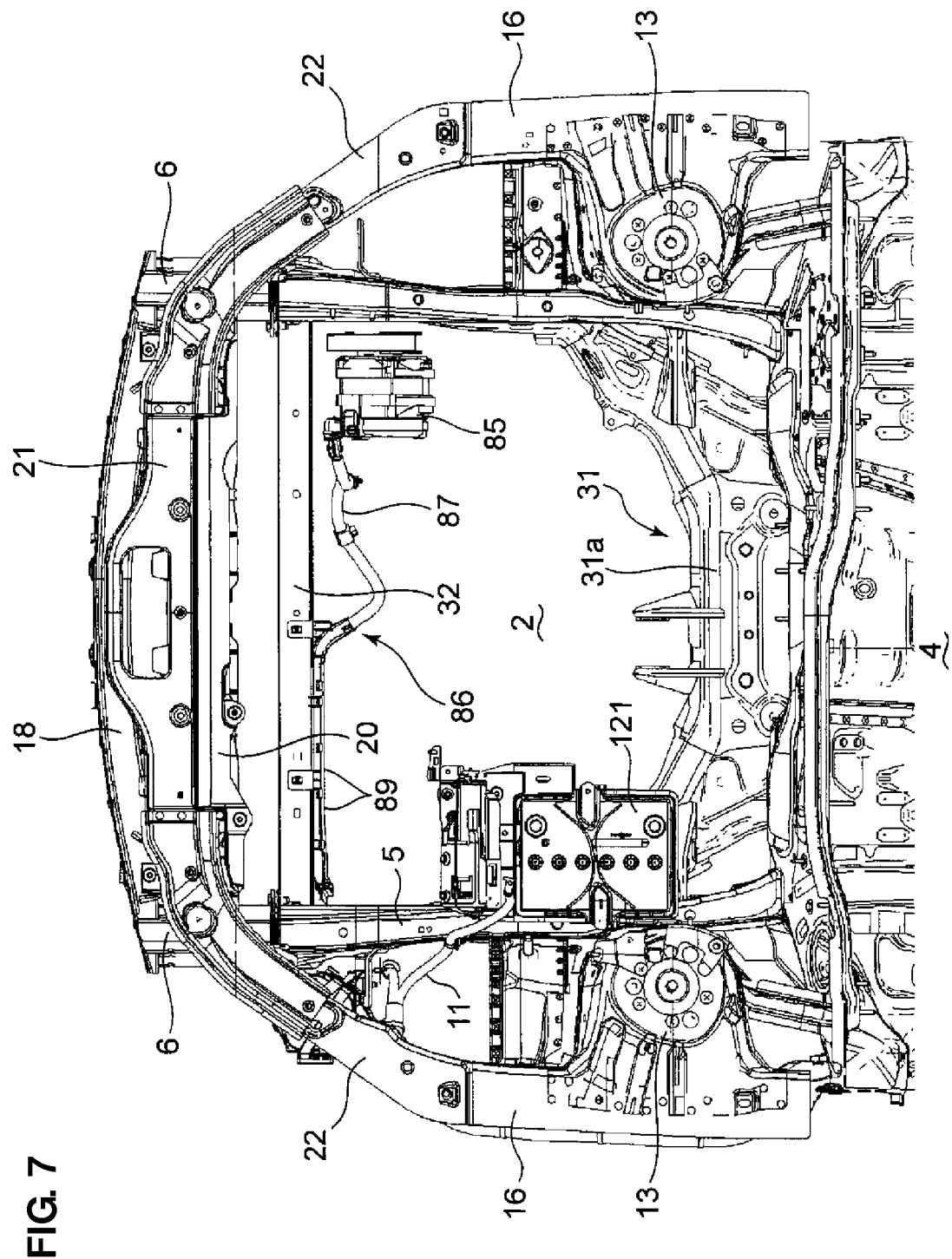
FIG. 7 is a plan view showing an embodiment of the harness arrangement structure according to the present invention.
Figure 8:
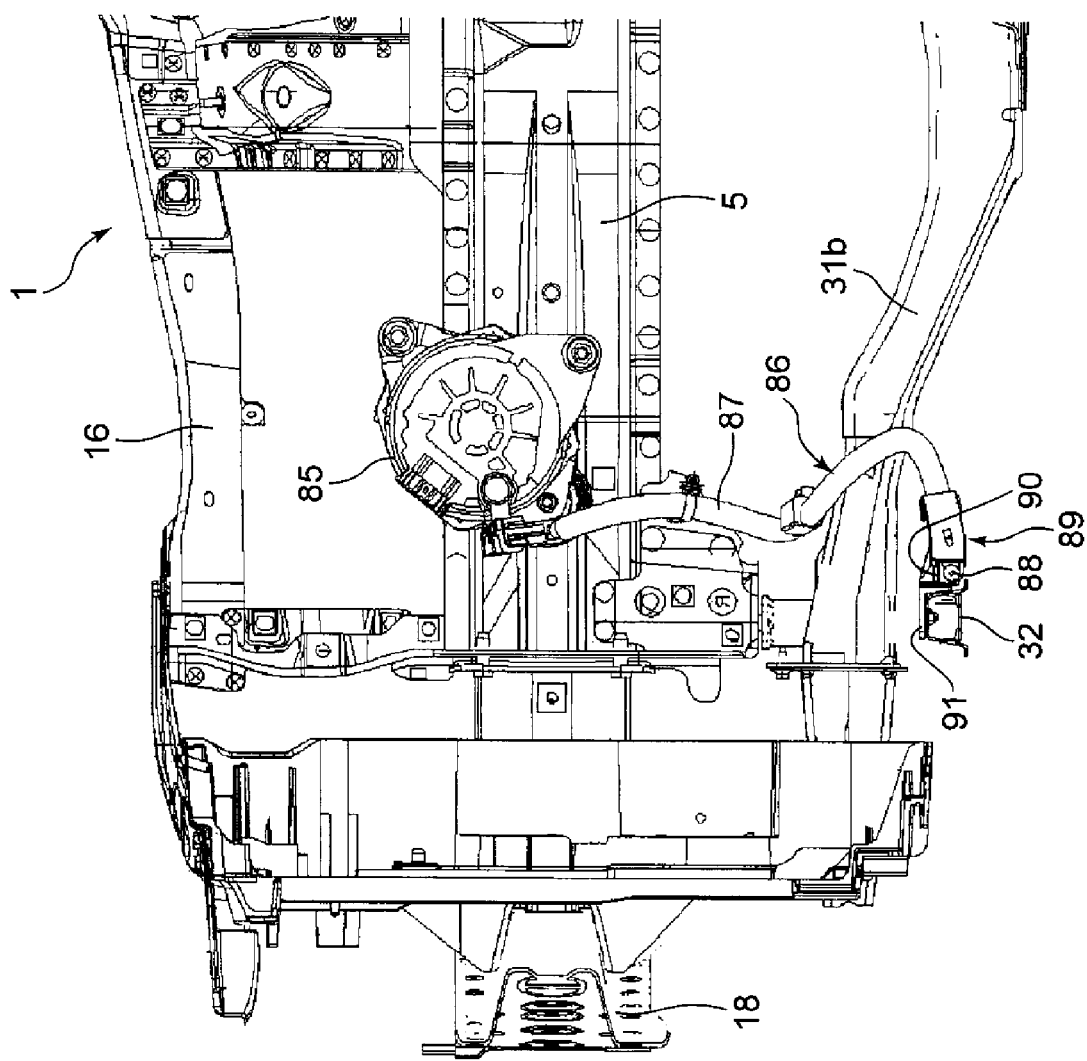
FIG. 8 is a side view of a provision portion of an electric-power supply device, when viewed from the vehicle left side.
Figure 9:
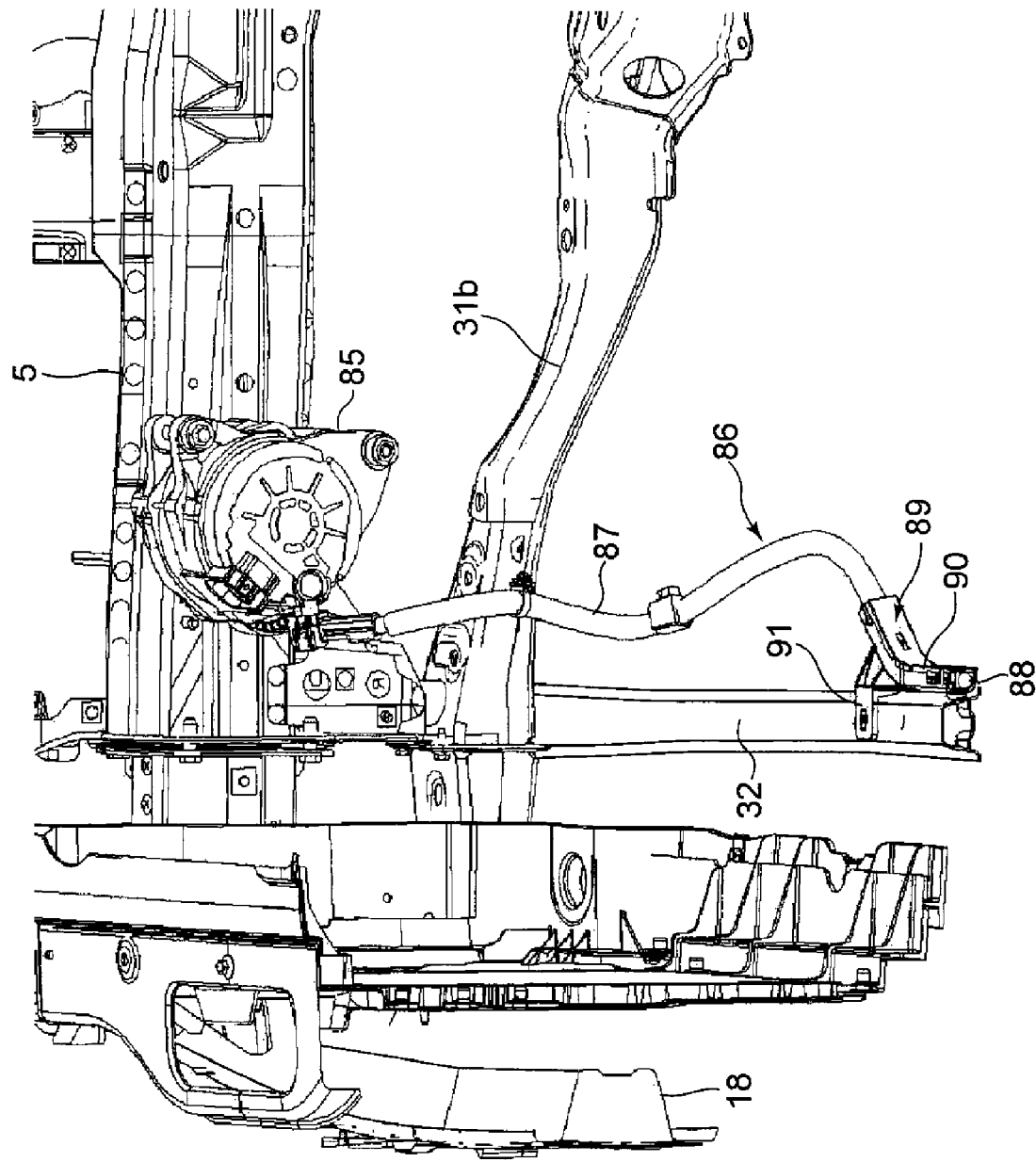
FIG. 9 is a perspective view of the provision portion of the electric-power supply device, when viewed obliquely from the vehicle left side and the vehicle upper side.

As shown in FIGS. 7 through 9, an electric-power supply device 85 to supply the electric power to the battery device 70, which is comprised of an alternator and others, is provided at a right-side position in the engine room 2 between the both-side front side frames 5, 5. The electric-power supply device 85 and the battery device 70 which is provided at a left-side position in the engine room 2 are interconnected by a first harness 86. The electric power which is generated by the electric-power supply device 85 comprised of the alternator and the others during the deceleration of the vehicle 1 is supplied to the battery device 70 via the first harness 86 for the electricity charging.

The electric-power supply device 85 is provided at a specified position on the right side of the vehicle body which is located substantially at the same level of the front side frame 5 and on the vehicle inside of a front portion of the front side frame 5 and in back of the connection cross member 32. The first harness 86 comprises a lowering portion 87 which extends obliquely downwardly from the electric-power supply device 85 toward a central portion of the connection cross member 32, and a horizontal portion 88 which extends in the vehicle width direction along the connection cross member 32, and an end portion of the horizontal portion 88 is connected to an attachment portion 78 which is provided at the support member 77 (see FIG. 13).

A first protector 89 to protect the horizontal portion 88 of the first harness 86 is provided at a back face of the connection cross member 32. The first protector 89 comprises a square-pipe-shaped protector body portion 90, into which the horizontal portion 88 of the first harness 86 is inserted, and an attachment bracket 91 which is provided at the right and left of the protector body portion 90. The attachment bracket 91 is fixed to an upper face of the connection cross member 32 via fastening members, such as bolts. The horizontal portion 88 of the first harness 86 is fixed to the back face of the connection cross member 32 in a state in which it is held by the first protector 89.

Figure 10:
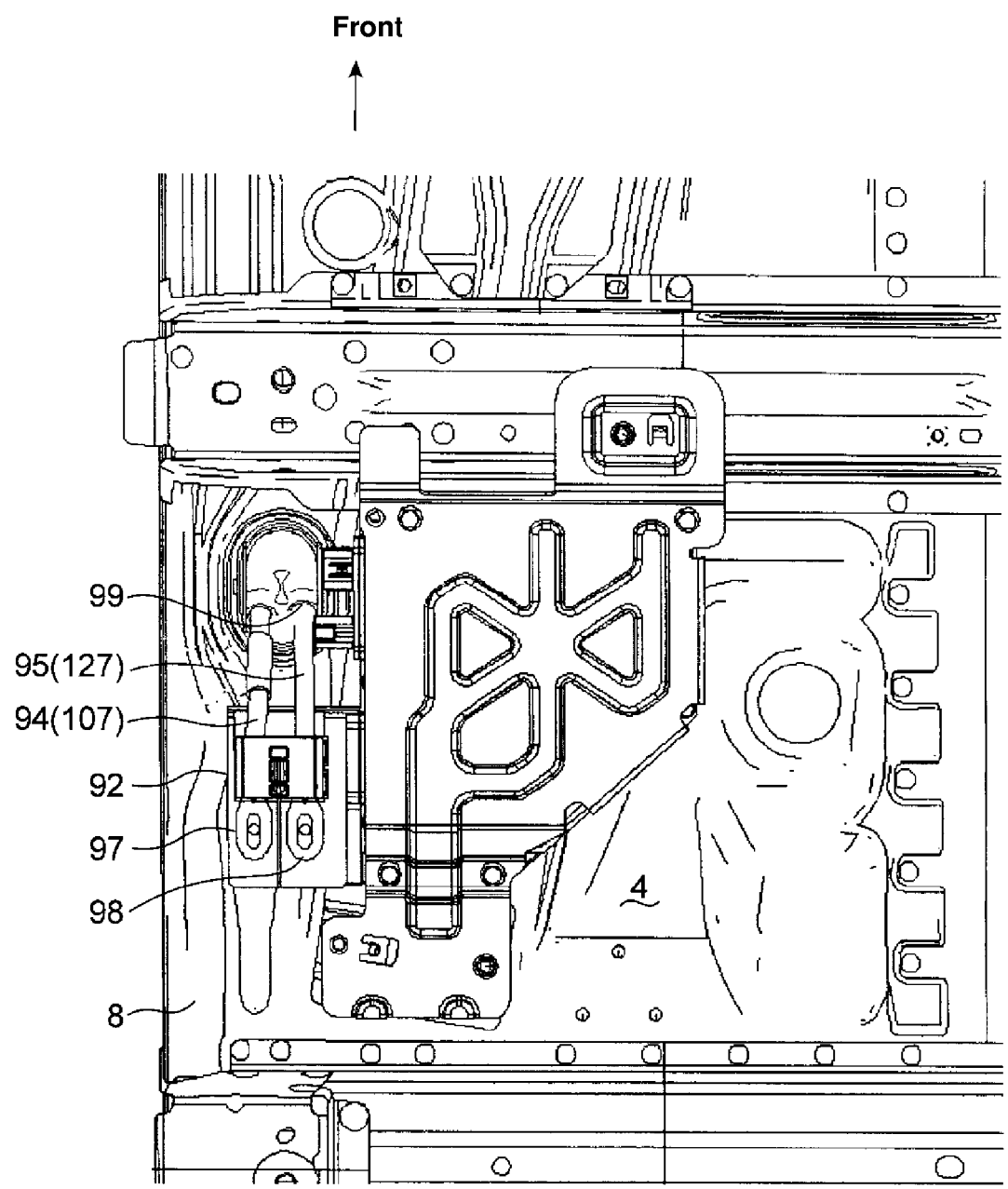
FIG. 10 is a plan view showing the provision portion of the electric-power supply device.

Further, as shown in FIG.10, an electric-power control device 92 for the battery device 70 is provided on the same vehicle side as the battery device 70 (on the left side of the vehicle body) and in back of the front tire 3 inside the vehicle compartment 4 provided behind the engine room 2. As shown in FIGS. 11 through 16, a second harness 94 is arranged along a wheel arch R which is formed by a mudguard 93 located above the front tire 3, and the battery device 70 and the electric-power control device 92 are interconnected by the second harness 94.

The electric power which is supplied from the battery device 70 to the electric-power control device 92 via the second harness 94 is supplied to electric components installed to the vehicle 1, such as an air conditioner, an audio device, a navigation device, or a lighting apparatus, in a state in which the voltage of that is decreased to a specified value by a DC/DC convertor (not illustrated) provided at the electric-power control device 92, and also supplied to the lead-acid battery 121 via a third harness 95 for charging.

The electric-power control device 92 is placed on the floor panel 8 below a driver's seat or a passenger's seat (assistant's seat) in the vehicle compartment 4, and has connection portions 97, 98 to which rear end portions of the above-described second and third harnesses 94, 95 are connected (see FIG. 10). The second and third harnesses 94, 95 are inserted into a through hole 99 which is formed at the floor panel 8 in front of the electric-power control device 92 and guided onto the floor panel 8, and then extend rearwardly to be connected to the connection portions 97, 98 of the electric-power control device 92.

Figure 11:
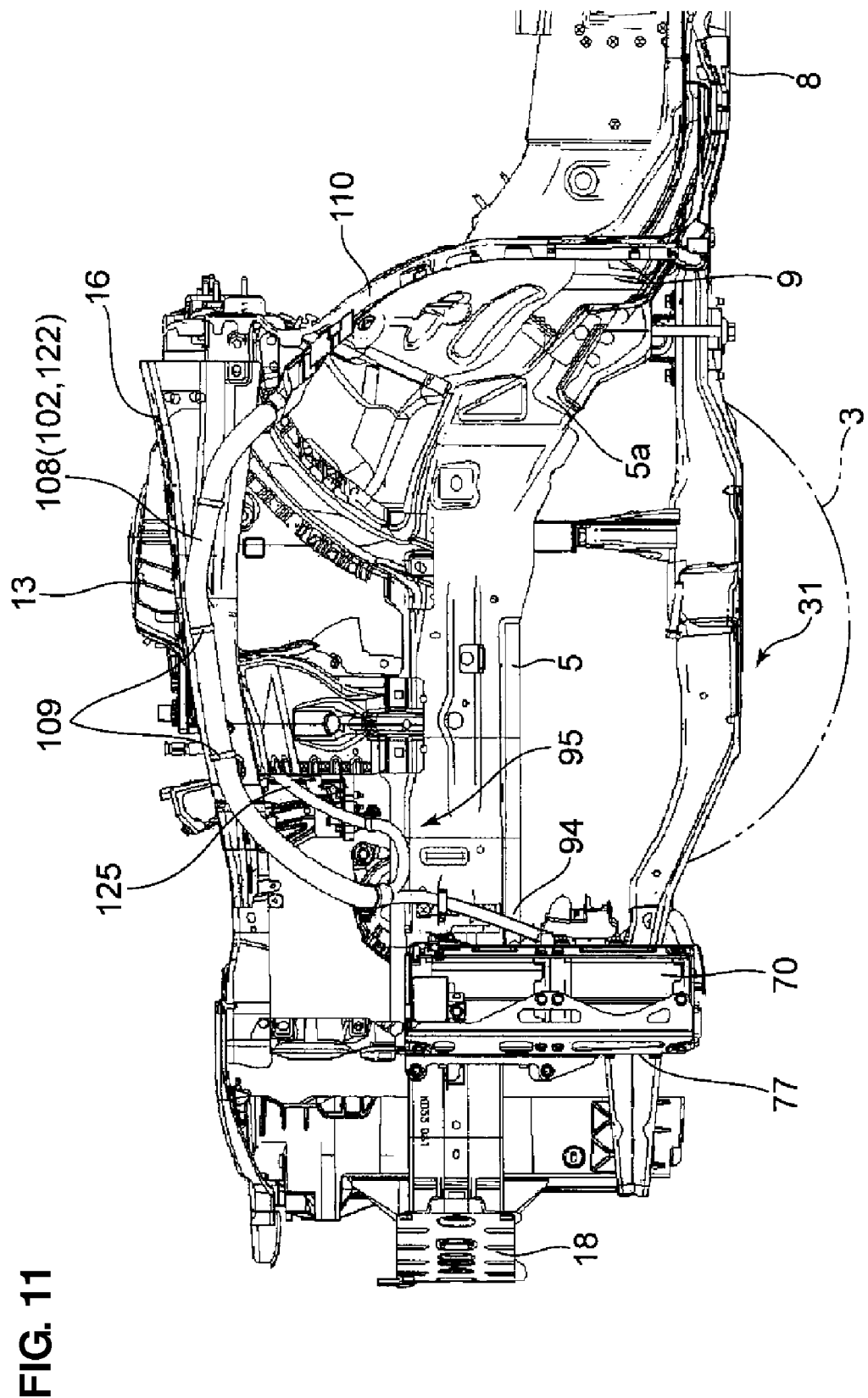
FIG. 11 is a side view showing an arrangement portion of a harness.
Figure 13:
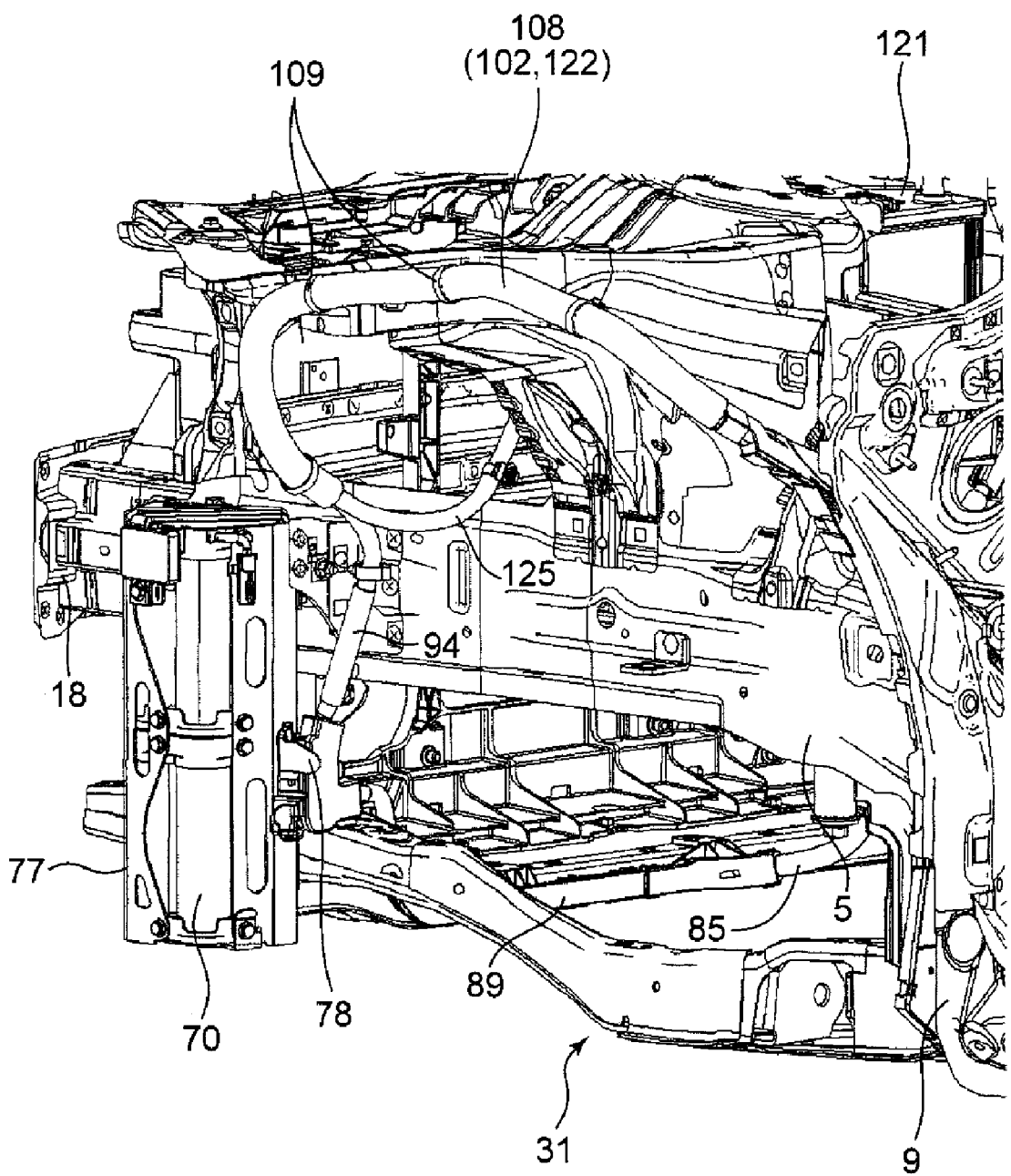
FIG. 13 is a perspective view of the arrangement portion of the harness, when viewed obliquely from the vehicle front-left side and a vehicle rear side.
Figure 14:
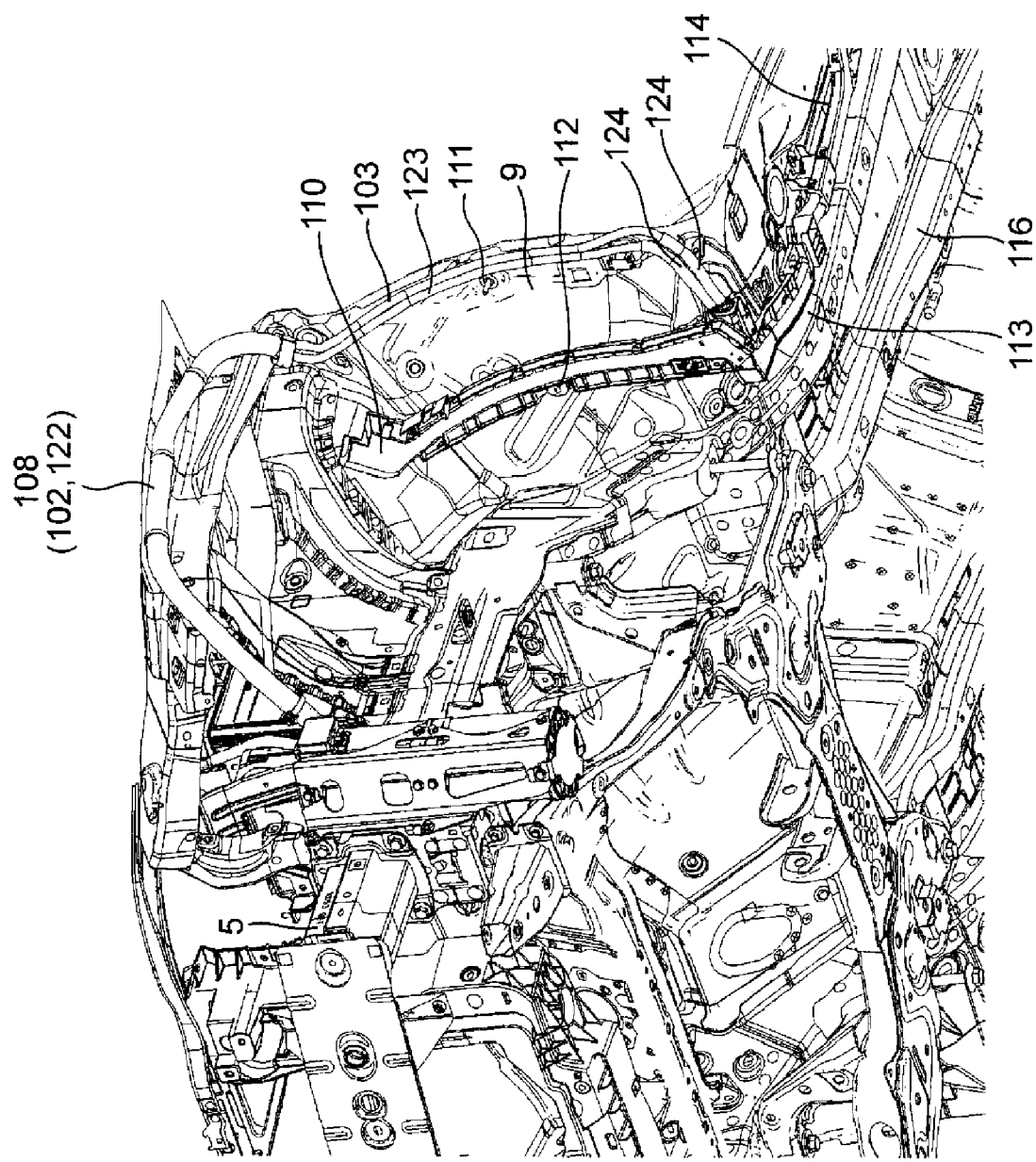
FIG. 14 is a perspective view of the arrangement portion of the harness, removing a second protector, when viewed obliquely from the vehicle front-left side and the vehicle lower side.
Figure 17:
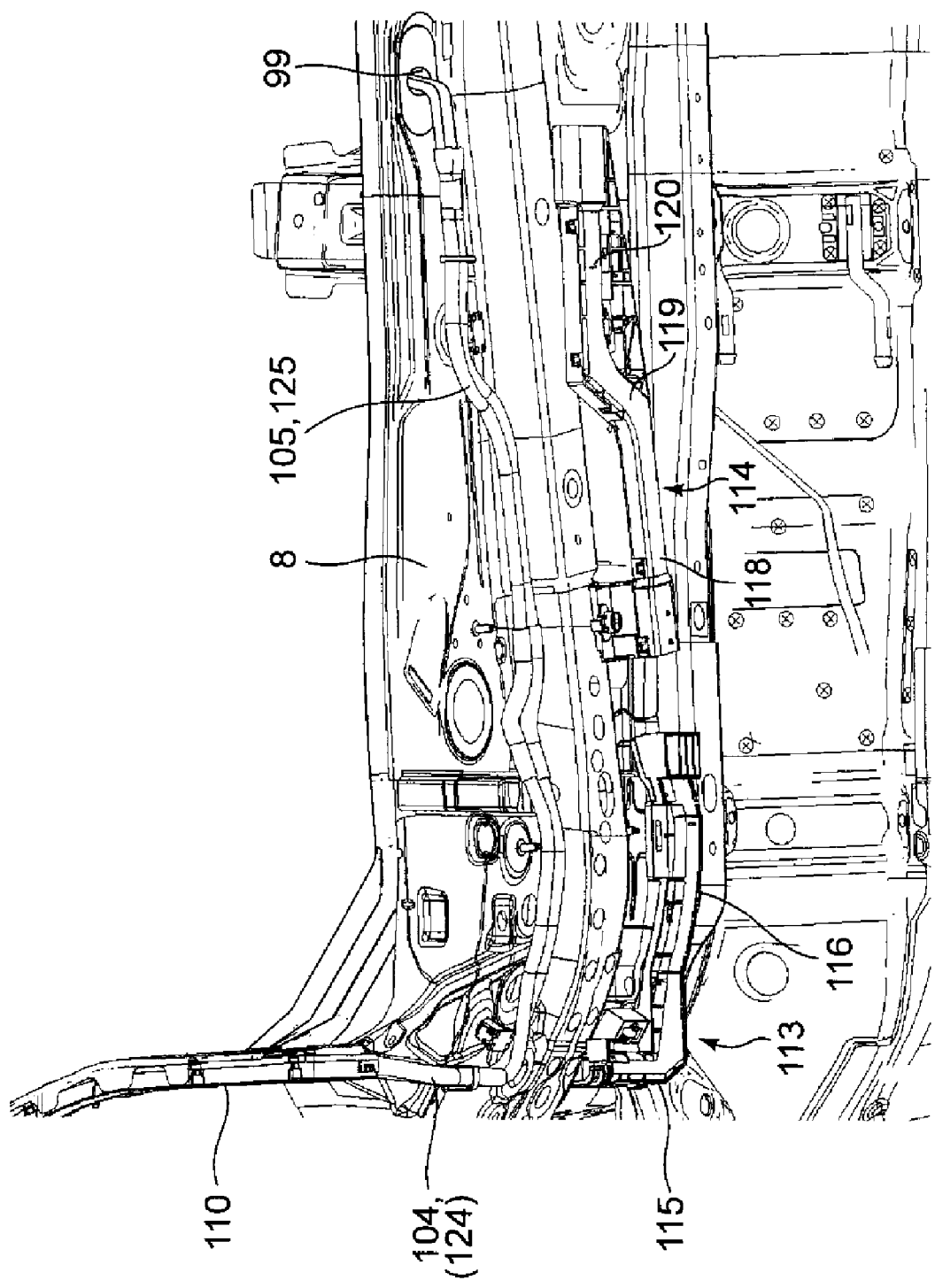
FIG. 17 is a perspective view of the arrangement portion of the harness, removing third and fourth protectors, when viewed obliquely from the vehicle left side and the vehicle lower side.
Figure 18:
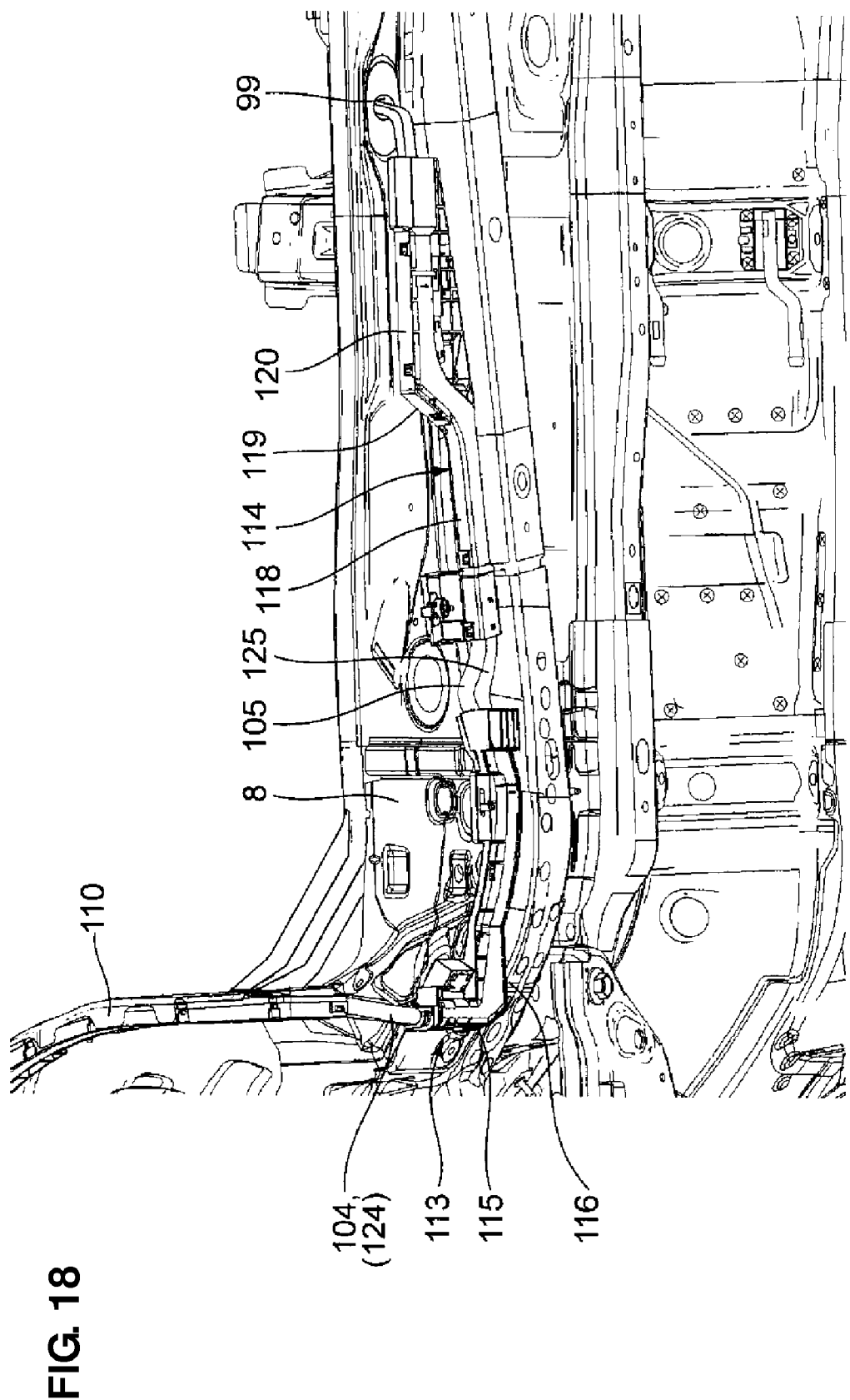
FIG. 18 is a perspective view of the arrangement portion of the harness below a floor panel, when viewed obliquely from the vehicle left side and the vehicle lower side.

The second harness 94 comprises, as shown in FIGS. 11, 13 and others, an arc-shaped portion 102 which curves upwardly from the connection portion 57a of the battery device 70 along the wheel arch R of the mudguard 93 above the front tire, a lowering portion 103 which extends downwardly along the front face of the side portion of the dash panel 9 as shown in FIG. 14 and others, a side extension portion 104 which extends toward the vehicle outside along the lower end portion of the dash panel 9 and the lower face of the front end portion of the floor panel 8, a rear extension portion 105 which extends rearwardly to a position in the vicinity of the electric-power control device 92 along the lower face of the floor panel 8 as shown in FIGS. 17, 18 and others, and a vehicle-compartment-inside guide portion 107 which is guided into the vehicle compartment 4, passing through the through hole 99 formed at the floor panel 8, and connected to the electric-power control device 92 (see FIG. 10).

The arc-shaped portion 102 of the second harness 94 is provided between the mudguard 93 and the wheel apron member 16 in a state in which it is covered with a covering tube 108 together with the third harness 95, and engaged with the wheel apron member 16 via plural engaging pieces 109. Thereby, the arc-shaped portion 102 of the second harness 94 is supported stably at the position between the mudguard 93 and the wheel apron member 16, so that any interference of the second harness with the front tire 3 can be surely prevented.

Figure 15:
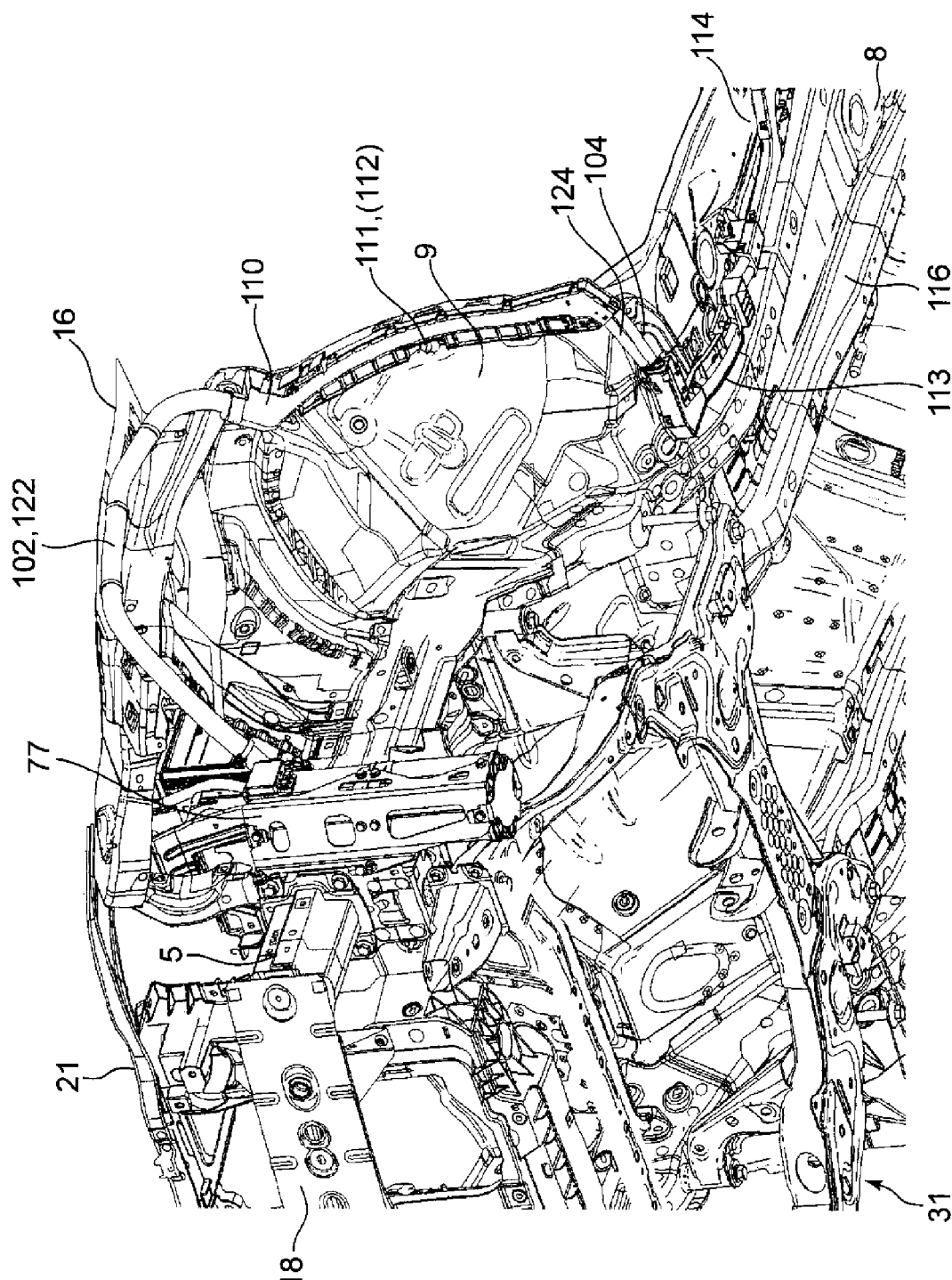
FIG. 15 is a perspective view of the arrangement portion of the harness, when viewed obliquely from the vehicle front-left side and the vehicle lower side.
Figure 16:
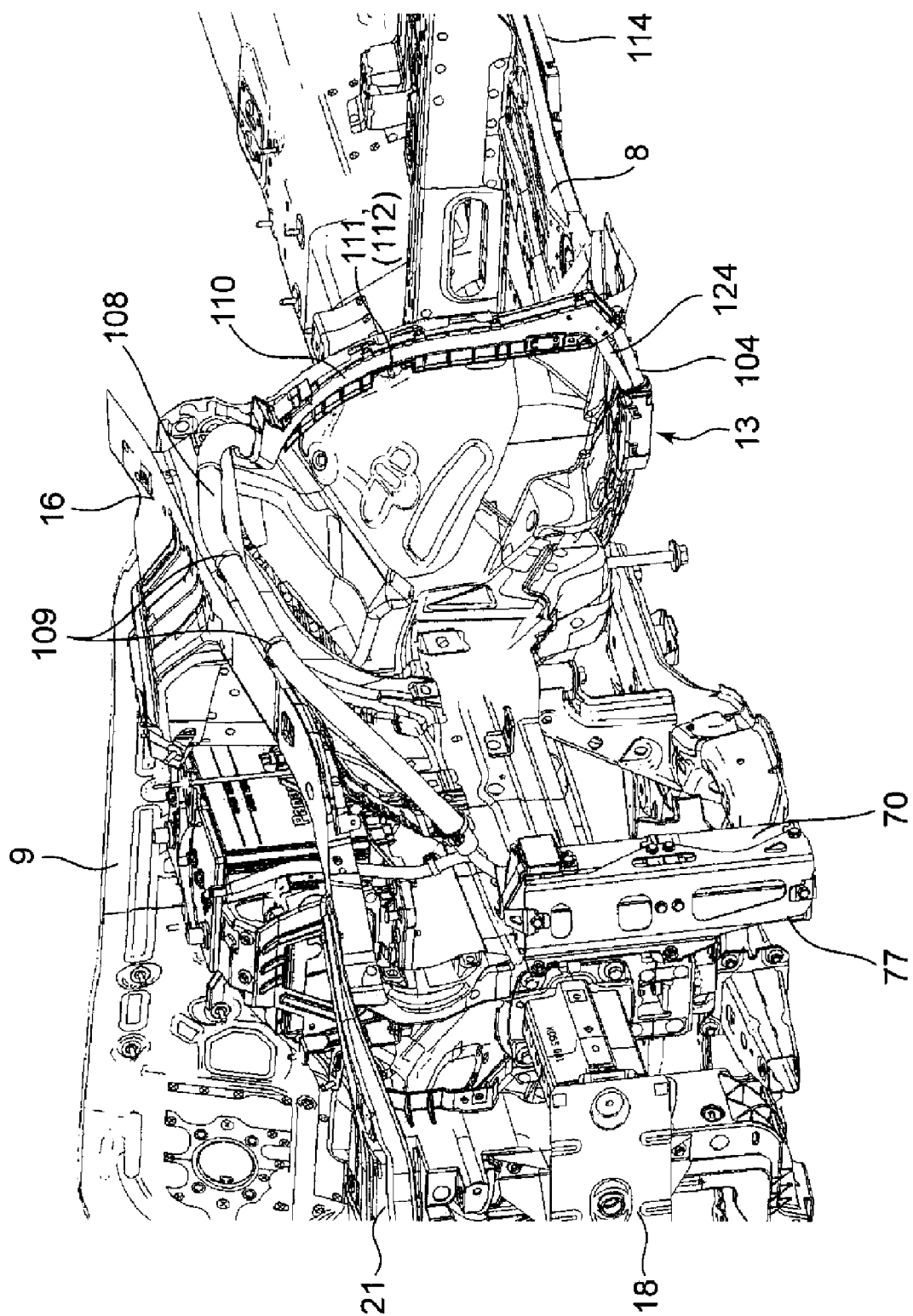
FIG. 16 is a perspective view of the arrangement portion of the harness, when viewed obliquely from the vehicle front-left side and the vehicle upper side.

Further, a second protector 110 to protect the lowering portion 103 of the second harness 94 is attached to the front face of the side portion of the dash panel 9 as shown in FIGS. 18 and 15. The second protector 110 has an engagement hole 112 to receive an engaging pin 111 which is formed at the front face of the dash panel 9 and project for engagement of therebetween. Herein, after the second harness 94 is arranged along the front face of the side portion of the dash panel 9, the second protector 110 is set to cover the lowering portion 103 of the second harness 94 from the vehicle front side so that the engaging pin 111 can be inserted into the engagement hole 112. Thereby, the second harness 94 can be fixed to the front face of the side portion of the dash panel 9 stably.

As shown in FIGS. 16 through 19, to the lower face of the front portion of the floor panel 8 are attached both a third protector 113 to protect the side extension portion 104 and the rear extension portion 105 of the second harness 94 and a fourth protector 114 to protect a rear portion of the rear extension portion 105. The third and fourth protectors 113, 114 have engagement holes to receive engaging pins which are formed at the lower face of the floor panel 8 and project for engagement of therebetween, respectively.

The third protector 113 comprises a lateral extension portion 115 which extends in the vehicle with direction along the front side portion of the floor panel 8 and a longitudinal portion 117 which extends longitudinally along an outside face portion of a floor frame 116 formed at the lower face of the floor panel 8. The side extension portion 104 of the second harness 94 is fixed to the lower face of the front end portion of the floor panel 8 by the lateral extension portion 115 of the third protector 113, and the rear extension portion 105 of the second harness 94 is fixed to the lower face of the side portion of the floor panel 8 by the longitudinal portion 117 of the third protector 113.

The fourth protector 114 comprises a front portion 118 which extends longitudinally along the outside face portion of the floor frame 116, a slant portion 119 which extends rearwardly and outwardly from a rear end portion of the front portion 118, and a rear portion 120 which extends rearwardly from a rear end portion of the slant portion 119 along an outside portion of the floor panel 8. The front portion 118 of the fourth protector 114 is provided behind and away from the rear side of the third protector 113. The rear extension portion 105 of the second harness 94 is held by the front portion 118, the slant portion 119 and the rear portion 120 of the fourth protector 114, so that part of the rear extension portion 105 (its middle portion in the vehicle longitudinal direction) is fixed along the lower face of the floor panel 8 in a state in which it bends rearwardly and outwardly (toward the vehicle outside).

Herein, it is possible that the slant portion 119 of the fourth protector 114 is omitted and the rear extension portion 105 of the second harness 94 is fixed to the floor panel 8 by the fourth protector extending straightly along the outside face portion of the floor frame 116. In this case, however, it may be necessary that the rear extension portion 105 of the second harness 94 extending straightly along the outside face portion of the floor frame 116 is bent upwardly and inserted into the through hole 99 at the floor panel 8, and then bent in the vehicle width direction toward the connection portions 97, 98 of the electric-power control device 92 and further bent rearwardly.

Figure 19:
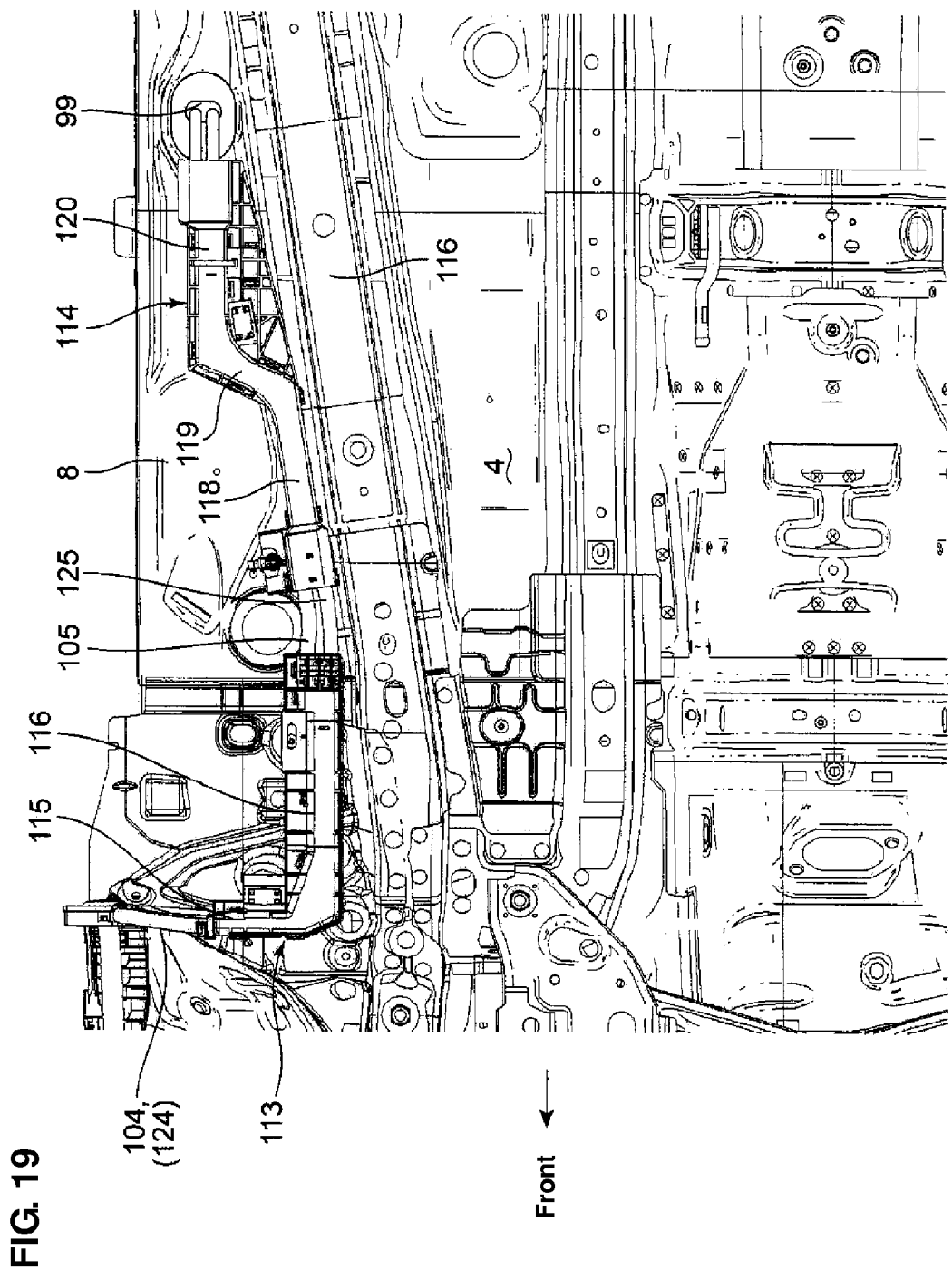
FIG. 19 is a bottom view of the arrangement portion of the harness below the floor panel.

Since each of the second harness 94 and the like has a specified diameter and a high rigidity, it may be difficult for each of those to be bent in a certain direction in a short distance. Accordingly, it is preferable that the front portion 118, the slant portion 119 and the rear portion 120 be formed at the fourth protector 114, as shown in FIG. 19, so that part of the rear extension portion 105 can be bent at a specified position located forwardly with a certain distance from the through hole 99 so as to extend rearwardly and outwardly. Thereby, a situation in which the rear extension portion 105 and the like of the second harness 94 are bent in the certain direction in the short distance can be prevented properly.

Figure 20:
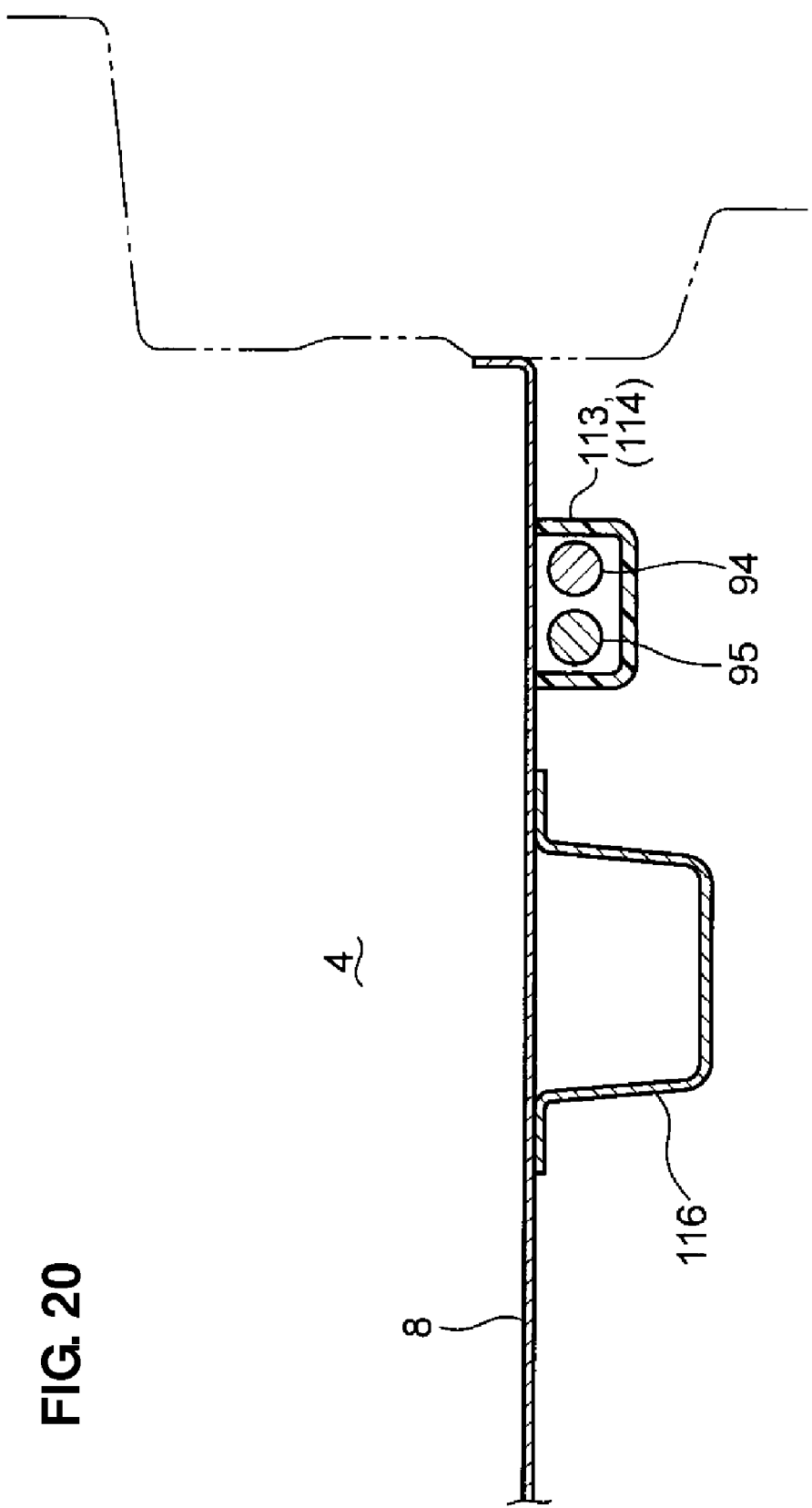
FIG. 20 is an elevation section view showing the arrangement portion of the harness below the floor panel.

As shown in FIG. 20, the vertical length of the third and fourth protectors 113, 114 is set to be smaller than that of a frame member which is comprised of the floor frame 116 provided along the lower face of the floor panel 8. Accordingly, the lower end face of the third and fourth protectors 113, 114 is located above the level of the lower end face of the floor frame 116 with a specified distance therebetween.

Further, as shown in FIGS. 7 and 11, the lead-acid battery 121 is provided substantially at the same longitudinal position as the suspension tower 13 on the vehicle inside of the left-side front side frame 5 in the engine room 2. The third harness 95 interconnecting the lead-acid battery 121 and the electric-power control device 92 is arranged in parallel to the second harness 94 as shown in FIGS. 11, 12 and 14.

That is, the third harness 95 comprises an arc-shaped portion 122 which curves upwardly along the wheel arch R of the mudguard 93, a lowering portion 123 which extends downwardly along the front face of the side portion of the dash panel 9, a side extension portion 124 which extends toward the vehicle inside along the lower face of the front end portion of the floor panel 8, a rear extension portion 125 which extends rearwardly to a position in the vicinity of the electric-power control device 92 along the lower face of the floor panel 8, and a vehicle-compartment-inside guide portion 127 which is guided into the vehicle compartment 4 passing through the through hole 99 formed at the floor panel 8 and connected to the electric-power control device 92 as shown in FIG. 10.

Figure 12:
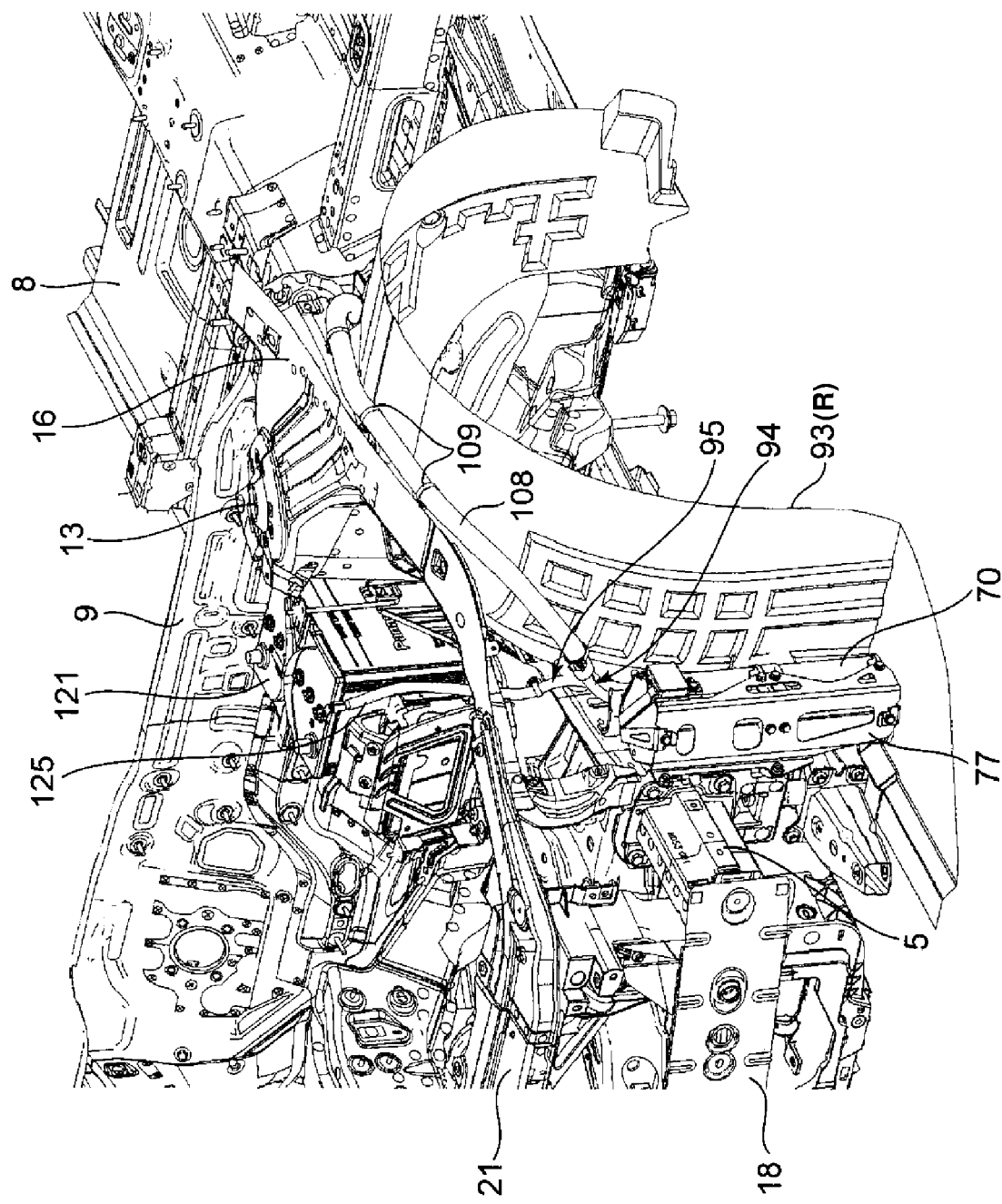
FIG. 12 is a perspective view of the arrangement portion of the harness, when viewed obliquely from the vehicle front-left side and the vehicle upper side.

The arc-shaped portion 122 of the third harness 95 is, as shown in FIGS. 11, 12 and others, provided between the mudguard 93 and the wheel apron member 16 in a state in which it is covered with the covering tube 108 together with the arc-shaped portion 102 of the second harness 94, and engaged with the wheel apron member 16 via the plural engaging pieces 109.

The lowering portion 123 of the third harness 95 is fixed to the front face of the side portion of the dash panel 9 by the second protector 110, integrally with the lowering portion 102 of the second harness 94. Further, the side extension portion 124 and the rear extension portion 125 of the third harness 95 are fixed to the lower face of the floor panel 8 by the third and fourth protectors 113, 114, integrally with the side extension portion 104 and the rear extension portion 105 of the second harness 94.

The side extension portion 125 which extends toward the vehicle inside from a front end portion of the arc-shaped portion 122 of the third harness 95 is connected to the lead-acid battery 121, so that the electric power is supplied to the lead-acid battery 121 from the electric-power control device 92 via the third harness 95 and charged at the lead-acid battery 121.

As described above, the harness arrangement structure of a vehicle according to the present embodiment comprises a pair of front side frames 5 extending in the vehicle longitudinal direction, the internal combustion engine E provided between the front side frames 5, a pair of front tires 3 provided on the vehicle outside of the front side frames 5, the battery device 70 provided at the specified position which is located on the vehicle outside of one of the front side frames 5 and in front of one of the front tires 3, the electric-power control device 92 provided in back of the one of the front tires 3, and the second harness 94 interconnecting the electric-power control device 92 and the battery device 70 and arranged along the wheel arch R which is formed above the one of the front tires 3. Accordingly, the battery device 70 can be cooled efficiently and the second harness 94 interconnecting the battery device 70 and the electric-power control device 92 can be arranged properly.

That is, since it is provided at the specified position which is located on the vehicle outside of front side frame 5 (at the outside position in the engine room 2), the battery device 70 can be cooled efficiently by the traveling air of the vehicle, preventing it from receiving any improper heat influence from the engine E effectively. Further, in the case in which the battery device 70 is located in back of the crash can 6 as described above, the function of impact absorption of the crash cans 6 may not be restrained by the battery device 70 as well as the battery device 70 may be prevented from being broken in a light vehicle collision in which the crash cans 6 receive an impact load from the bumper beam 18 and thereby crush longitudinally.

Moreover, since the second harness 94 interconnecting the electric-power control device 92 and the battery device 70 is arranged along the wheel arch R, despite an arrangement of the battery device 70 and the electric-power control device 92 which are respectively located in front of the front tire 3 and in back of the front tire 3, it can be prevented that the second harness 94 interferes with the front tire 3 and the length of the second harness 94 is too long, so that the battery device 70 and the electric-power control device 92 can be properly interconnected by the second harness 94.

Also, since the second harness 94 is arranged between the mudguard 93 forming the wheel arch R and the wheel apron member 16 provided above the mudguard 93, an arrangement state of the second harness 94 can be stable, and the mudguard 93 can effectively prevent the second harness 94 from receiving any improper influence from rain, small stones, or the like during the vehicle traveling.

Further, since the second harness 94 is arranged along the front face of the side portion of the dash panel 9 located at the front portion of the vehicle compartment, and the second protector 110 to protect the second harness 94 is provided along the front face of the side portion of the dash panel 9, the second harness 94 arranged along the wheel arch R can be prevented from twisting, so that the arrangement state of the second harness 94 can be more stable.

Moreover, since the electric-power control device 92 comprising the DC/DC convertor and others is provided above the floor panel 8 forming the bottom face of the vehicle compartment, the floor panel 8 can effectively prevent the electric-power control device 92 from receiving any improper influence from rain, small stones, or the like during the vehicle traveling. Since the second harness 94 is arranged to extend along the lower face of the floor panel 8 to the position in the vicinity of the electric-power control device 92 and then led up to the electric-power control device 92 positioned above the floor panel, the second harness 94 can be arranged properly, preventing a foot space of the passenger seated in a passenger's seat in the vehicle compartment 4 from being narrowed.

It may be possible that in a vehicle in which the electric-power control device 92 is positioned on the floor panel 8 located on the driver's seat side, a through hole for the second harness 94 is formed at the dash panel 9 and the second harness 94 is arranged in the vehicle compartment 4 through the through hole formed at the dash panel 9. In this case, however, there is a problem in that the second harness 94 is required to be arranged properly avoiding some members, such as pedal members, attached to the dash panel 9. In contrast, in the case in which the second harness 94 is arranged along the lower face of the floor panel 8 as described above, there is no need of considering any interference of the second harness 94 with the above-described pedal members and the like, so that the arrangement of the second harness 94 can be easier and more appropriate.

In the case in which the third and fourth protectors 113, 114 to protect the second harness 94 arranged along the lower face of the floor panel 8 are provided as shown in FIG. 20 and the lower end face of the protectors are located above the lower end face of the frame member comprised of the floor frame 116 and the like which are provided along the lower face of the floor panel 8, the second harness 94 can be protected by the third and fourth protectors 113, 114 effectively, and it can be prevented that the protectors 113, 114 interferer with a road surface during the vehicle traveling, thereby restraining any damage of the protectors 113, 114.

Also, since the harness arrangement structure of the present embodiment further comprises the connection cross member 32 extending in the vehicle width direction and interconnecting the pair of front side frames 5, wherein the electric-power supply device 85 which is comprised of the alternator and the like is provided between the pair of front side frames 5, and the first harness 86 which interconnects the electric-power supply device 85 and the battery device 70 is arranged along the connection cross member 32, even if the electric-power supply device 85 and the battery device 70 are arranged away from each other in the engine room 2, the first harness 86 interconnecting these devices 85, 70 can be supported at the cross member stably.

In particular, in the case in which the first harness 86 is arranged along the back face of the connection cross member 32 as shown in the present embodiment, the first harness 86 can be effectively protected by the connection cross member 32 from the impact load acting from the vehicle front in the vehicle frontal collision or the like, and a situation in which the first harness 86 improperly restrain an appropriate swinging deformation or the like of the radiator supported at the shroud 20 at the front portion in the engine room 2 can be prevented.

That is, while it may be considered to arrange the first harness 86 in front of the front face of the connection cross member 32 or along the upper face of the connection cross member 32, in this case it is difficult for the connection cross member 32 to effectively protect the first harness 86 from the impact load acting in the vehicle frontal collision. Further, since the radiator swings around a swing axis provided at a lower end portion of the radiator, in a case in which the first harness 86 is arranged along the front face of the connection cross member 32 in a vehicle in which the radiator is protected from the load of the vehicle frontal collision, the appropriate swinging deformation of the radiator might be restrained by the first harness 86. Accordingly, it is preferable that the first harness 86 be arranged along the back face of the connection cross member 32.

Moreover, since the lead-acid battery 121 is provided on the vehicle inside of the front side frame 5 positioned on the same side of battery device 70 which is comprised of the capacitor and the third harness 95 interconnecting the lead-acid battery 121 and the electric-power control device 92 is arranged in parallel to the second harness 94, the second harness 94 and the third harness 95 can be arranged along the wheel arch R formed above the front tire 3 in a state in which these harnesses 94, 95 are bound together.

The present invention should not be limited to the above-described embodiment, and any other modifications and improvements may be applied within the scope of a sprit of the present invention. For example, while the battery device 70 according to the present embodiment is provided at the specified position which is located on the vehicle outside of the left-side front side frame 5 (on the left side) and between the front tire 3 and the crash can 6 in the vehicle longitudinal direction (above the left-side undercover 41), it may be positioned on the vehicle outside of the right-side front side frame 5 (on the right side) and between the front tire 3 and the crash can 6 in the vehicle longitudinal direction.

Also, while the battery device 70 according to the present embodiment is positioned on the vehicle inside to be offset from the left-side front tire 3 in the elevational view of the vehicle, it may be located substantially on the same position as the left-side front tire 3 in the vehicle width direction. However, it may be preferable that the battery device 70 be positioned to be offset from the front tire 3 located closer to the battery device 70 in the elevational view of the vehicle from viewpoints of obtaining an appropriate impact absorption performance in the heavy vehicle collision.

What is claimed is:

1. A harness arrangement structure of a vehicle, comprising:
   a pair of front side frames extending in a vehicle longitudinal direction;
   an internal combustion engine provided between the front side frames;
   a pair of front tires provided on a vehicle outside of the front side frames;
   a battery device provided at a specified position which is located on the vehicle outside of one of the front side frames and in front of one of the front tires;
   an electric-power control device for the battery device provided in back of said one of the front tires; and
   a harness interconnecting the electric-power control device and the battery device and arranged along a wheel arch which is formed above said one of the front tires,
   wherein said electric-power control device is provided above a floor panel forming a bottom face of a vehicle compartment, said harness is arranged to extend along a lower face of the floor panel to a position in the vicinity of the electric-power control device and then led up to the electric-power control device positioned above the floor panel.

2. The harness arrangement structure of a vehicle of claim 1, wherein said harness is arranged along a front face of a side portion of a dash panel located at a front portion of a vehicle compartment, and a protector to protect the harness is provided along the front face of the side portion of the dash panel.

3. The harness arrangement structure of a vehicle of claim 1, wherein said harness is arranged between a mudguard forming said wheel arch and a wheel apron member provided above the mudguard.

4. The harness arrangement structure of a vehicle of claim 1, wherein a protector to protect said harness arranged along the lower face of the floor panel is provided above a lower end face of a frame member which is provided along the lower face of the floor panel.

5. The harness arrangement structure of a vehicle of claim 2, wherein another protector to protect said harness arranged along the lower face of the floor panel is provided above a lower end face of a frame member which is provided along the lower face of the floor panel.

6. The harness arrangement structure of a vehicle of claim 1, further comprising a cross member extending in a vehicle width direction and interconnecting said pair of front side frames, wherein an electric-power supply device is provided between the pair of front side frames, and another harness which interconnects the electric-power supply device and said battery device is arranged along said cross member.

7. A harness arrangement structure of a vehicle, comprising:
   a pair of front side frames extending in a vehicle longitudinal direction;
   an internal combustion engine provided between the front side frames;
   a pair of front tires provided on a vehicle outside of the front side frames;
   a battery device provided at a specified position which is located on the vehicle outside of one of the front side frames and in front of one of the front tires;
   an electric-power control device for the battery device provided in back of said one of the front tires; and
   a harness interconnecting the electric-power control device and the battery device and arranged along a wheel arch which is formed above said one of the front tires,
   wherein said harness is arranged between a mudguard forming said wheel arch and a wheel apron member provided above the mudguard,
   said harness is arranged along a front face of a side portion of a dash panel located at a front portion of a vehicle compartment, and a protector to protect the harness is provided along the front face of the side portion of the dash panel, and
   said electric-power control device is provided above a floor panel forming a bottom face of a vehicle compartment, said harness is arranged to extend along a lower face of the floor panel to a position in the vicinity of the electric-power control device and then led up to the electric-power control device positioned above the floor panel.

8. The harness arrangement structure of a vehicle of claim 7, wherein another protector to protect said harness arranged along the lower face of the floor panel is provided above a lower end face of a frame member which is provided along the lower face of the floor panel.

9. The harness arrangement structure of a vehicle of claim 7, further comprising a cross member extending in a vehicle width direction and interconnecting said pair of front side frames, wherein an electric-power supply device is provided between the pair of front side frames, and another harness which interconnects the electric-power supply device and said battery device is arranged along said cross member.

10. A harness arrangement structure of a vehicle, comprising:
    a pair of front side frames extending in a vehicle longitudinal direction;
    an internal combustion engine provided between the front side frames;
    a pair of front tires provided on a vehicle outside of the front side frames;
    a battery device provided at a specified position which is located on the vehicle outside of one of the front side frames and in front of one of the front tires;
    an electric-power control device for the battery device provided in back of said one of the front tires;
    an electric-power supply device provided between the front side frames;
    a harness interconnecting the electric-power control device and the battery device and arranged along a wheel arch which is formed above said one of the front tires; and
    a cross member extending in a vehicle width direction and interconnecting the pair of front side frames,
    wherein said electric-power control device is provided above a floor panel forming a bottom face of a vehicle compartment, said harness is arranged to extend along a lower face of the floor panel to a position in the vicinity of the electric-power control device and then led up to the electric-power control device positioned above the floor panel, and another harness which interconnects the electric-power supply device and said battery device is arranged along said cross member.

11. The harness arrangement structure of a vehicle of claim 10, wherein said harness interconnecting the electric-power control device and the battery device is arranged between a mudguard forming said wheel arch and a wheel apron member provided above the mudguard.

12. The harness arrangement structure of a vehicle of claim 10, wherein said harness interconnecting the electric-power control device and the battery device is arranged along a front face of a side portion of a dash panel located at a front portion of a vehicle compartment, and a protector to protect the harness is provided along the front face of the side portion of the dash panel.

13. The harness arrangement structure of a vehicle of claim 10, wherein a protector to protect said harness interconnecting the electric-power control device and the battery device which is arranged along the lower face of the floor panel is provided above a lower end face of a frame member which is provided along the lower face of the floor panel.

* * * * *